(12) United States Patent
Usui et al.

(10) Patent No.: US 7,820,772 B2
(45) Date of Patent: *Oct. 26, 2010

(54) HARDENER FOR EPOXY RESIN AND EPOXY RESIN COMPOSITION

(75) Inventors: Taketoshi Usui, Yokohama (JP);
Kazuhiko Yamamoto, Fuji (JP);
Hisanao Yamamoto, Yokohama (JP);
Kazuhiro Daikai, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 840 days.

This patent is subject to a terminal disclaimer.

(21) Appl. No.: 10/594,594

(22) PCT Filed: Mar. 30, 2005

(86) PCT No.: PCT/JP2005/006129

§ 371 (c)(1),
(2), (4) Date: May 8, 2007

(87) PCT Pub. No.: WO2005/095486

PCT Pub. Date: Oct. 13, 2005

(65) Prior Publication Data

US 2007/0244268 A1    Oct. 18, 2007

(30) Foreign Application Priority Data

Mar. 31, 2004  (JP) ............................. 2004-102617
Aug. 3, 2004   (JP) ............................. 2004-226431

(51) Int. Cl.
*C08L 63/00* (2006.01)
*C08G 59/18* (2006.01)
*C08G 59/50* (2006.01)
*B32B 27/38* (2006.01)

(52) U.S. Cl. ........................ 525/526; 523/427; 523/428; 525/523; 525/524; 525/525; 528/119; 528/121; 528/422

(58) Field of Classification Search ..................... None
See application file for complete search history.

(56) References Cited

U.S. PATENT DOCUMENTS

| | | | |
|---|---|---|---|
| 3,860,541 A | | 1/1975 | Lehmann et al. |
| 4,656,207 A | * | 4/1987 | Jabloner et al. ............. 523/400 |
| 4,680,076 A | * | 7/1987 | Bard ........................ 156/306.9 |
| 4,783,506 A | * | 11/1988 | Gawin ........................ 525/109 |
| 5,994,785 A | | 11/1999 | Higuchi et al. |
| 6,759,506 B1 | | 7/2004 | Fischer et al. |
| 2009/0261298 A1 | * | 10/2009 | Kondo et al. ................. 252/500 |

FOREIGN PATENT DOCUMENTS

| | | |
|---|---|---|
| EP | 0 459 745 A2 | 12/1991 |
| EP | 0 545 640 A1 | 6/1993 |
| EP | 0 955 675 A2 | 11/1999 |
| JP | 59-038226 A | 3/1984 |
| JP | 64-70523 A | 3/1989 |
| JP | 4-53818 A | 2/1992 |
| JP | 5-262903 A | 10/1993 |
| JP | 6-49176 A | 2/1994 |
| JP | 2004-63992 A | 2/2004 |
| TW | 487715 | 5/2002 |

OTHER PUBLICATIONS

Zhao et al., Conference Proceedings, Society of Plastics Engineers. Annual Technical Conferences, May 2, 1999, pp. 921-924.

* cited by examiner

*Primary Examiner*—Michael J Feely
(74) *Attorney, Agent, or Firm*—Birch Stewart Kolasch & Birch, LLP

(57) ABSTRACT

An amine hardener for epoxy resins which comprises an amine adduct (A) and a low-molecular amine compound (B) as major components, wherein the molecular weight distribution of the amine adduct (A), which is defined by the ratio of the weight-average molecular weight to the number-average molecular weight, is 3 or lower and the low-molecular amine compound (B) is contained in an amount of 0.001 to 1 part by mass per 100 parts by mass of the amine adduct (A).

19 Claims, No Drawings

HARDENER FOR EPOXY RESIN AND EPOXY RESIN COMPOSITION

TECHNICAL FIELD

The present invention relates to a novel hardener for an epoxy resin, and an epoxy resin composition. For more detail, the present invention relates to a hardener for an epoxy resin, having both excellent hardening property at low temperature and storage stability, and easy formulating property with an epoxy resin and in addition latent hardening property furnishing good hardened substance characteristics; and an epoxy resin composition excellent in storage stability at high temperature; and epoxy resin-based material using the same.

BACKGROUND ART

An epoxy resin is utilized in wide application fields such as coating material, insulating material for electric and electronics parts, and adhesives, because the hardened material has an excellent performance in terms of mechanical characteristics, electrical characteristics, thermal characteristics, chemical resistance, and adhesion properties. An epoxy resin composition generally used at present is a so-called two component type one, wherein two fluids, an epoxy resin and a hardener, are mixed just before use.

A two component epoxy resin composition, although which can be hardened at room temperature, requires for an epoxy resin and a harder to separately be stored, and to be used after weighing and mixing both when needed, which makes storage or handling cumbersome and complicated.

In addition, because of limited usable life, a large quantity of mixing in advance is not allowed, and formulating frequency is increased, which makes decrease in efficiency unpreventable.

To solve the problems of such a two component epoxy resin formulation, there have been some proposals of one component epoxy resin compositions. For example, those wherein an epoxy resin is formulated with a latent hardener such as dicyandiamide, a $BF_3$-amine complex, an amine salt or a modified imidazole compound, and the like are included.

However, among these latent hardeners, those excellent in storage stability have lower hardening property and require high temperature or a long period of time for hardening, while those having high hardening property have low storage stability and therefore require to be stored at low temperature, for example, at −20° C. For example, dicyandiamide provides a storage stability of a formulated product of not shorter than 6 months at room temperature, however, requires a hardening temperature of not lower than 170° C., and in the case of combined use of a hardening accelerator to lower this hardening temperature, hardening at, for example, 130° C. becomes possible but on the other hand storage stability at room temperature becomes insufficient, which inevitably requires storage at low temperature. Therefore, a composition satisfying both high hardening property and excellent storage stability has strongly been required. In addition, in the case of obtaining a film-like molded product or a product of a substrate impregnated with an epoxy resin, a formulated product containing a solvent or a reactive diluent and the like is observed in many cases, and use of a conventional latent hardener as a hardener for such a formulated product significantly decreases storage stability and substantially requires to make a two component type hardener, and therefore improvement of such inconvenience has been required.

In response to such requirement, many researches have been made, for example, in Patent Document 1, a hardener for an epoxy resin coated at the surface with a reaction product of an isocyanate compound is described.

However, recently, in particular in an electronics device field, further improvement of hardening property without impairing storage stability has strongly been required for a one component epoxy resin composition used as one of connection materials, to respond to higher density or improvement of connection reliability of a circuit, or to use low heat resistant material as means for weight reduction of mobile device, or aiming at significant improvement of productivity, which has been difficult to attain by conventional technology.

[Patent Document 1] JP-A-1-70523

DISCLOSURE OF INVENTION

Problem to be Solved by the Invention

It is an object of the present invention to provide a one component epoxy resin composition satisfying both high hardening property and storage stability, and a latent hardener for obtaining the same, along with anisotropic conductive material, conductive adhesive material, insulating adhesive material, sealant, structural adhesives, and the like, which are capable of furnishing high storage stability, and high connection reliability, adhesive strength and high sealing property even under hardening condition at low temperature or in a short period of time.

Means for Solving the Problem

The present inventors have intensively studied a way to solve the above problems and have found that the above-described problems can be solved by using an amine hardener containing an amine adduct, having specified molecular weight distribution, and a low molecular weight amine compound in the specified ratio, and by using a specified epoxy resin and preferably by containing a cyclic borate ester compound, and thus have completed the present invention.

Namely, the present invention has the following aspects:

1) An amine hardener for an epoxy resin comprising an amine adduct (A) and a low molecular weight amine compound (B) as major components, wherein the molecular weight distribution of the amine adduct (A), which is defined by the ratio of the weight average molecular weight and the number average molecular weight, is 3 or lower, and the content of the low molecular weight amine compound (B) is 0.001 to 1 part by mass, based on 100 parts by mass of the amine adduct (A).
2) The hardener according to the above-described 1), wherein it is in solid state at 25° C.
3) The hardener according to the above-described 1) or 2), wherein said amine adduct (A) is obtained by a reaction between an epoxy resin (a1) and an amine compound (b1).
4) The hardener according to any one of the above-described 1) to 3), wherein said low molecular weight amine compound (B) is imidazoles.
5) An epoxy resin composition, comprising: a microcapsule type hardener (D) for an epoxy resin comprising a core and a shell, wherein said core comprising at least one kind of a hardener (C) for an epoxy resin selected from the group consisting of the hardeners according to the above-described 1 to 4, and said shell containing a synthetic resin or an inorganic oxide, and comprising said microcapsule type hardener (D) for an epoxy resin covering said core and 10 to 50000 parts by mass of an epoxy resin (E), based on 100 parts by mass of said microcapsule type hardener (D), and in a master batch type hardener (F) for an epoxy resin, wherein said microcapsule type hardener (D) is dispersed in said epoxy resin (E), wherein a highly soluble epoxy resin (G), having a solubility parameter of 8.900 to 12.00, and a molecular weight between crosslinked points after hardening of 105 to 150, is contained in an amount of not lower than 0.1% by weight, based on the epoxy resin (E), and total chlorine amount of said master batch type hardener (F) for an epoxy resin is not higher than 2000 ppm.

6) The epoxy resin composition according to the above-described 5), wherein said highly soluble epoxy resin (G) has impurity components at the diol terminals equivalent to 0.001 to 30% of fundamental structure component of said highly soluble epoxy resin.

7) The epoxy resin composition according to the above-described 5) or 6), wherein the total chlorine amount of said epoxy resin (E) is not higher than 2000 ppm.

8) The epoxy resin composition according to any one of the above-described 5) to 7), wherein said microcapsule type hardener (D) for an epoxy resin is composed of a core comprising at least one kind of a hardener (C) for an epoxy resin, selected from the group consisting of the hardeners according to the above-described 1) to 4), which is covered with a shell comprising a coating film (c1) yielded by a reaction between an isocyanate compound (H) and an active hydrogen compound (I) and/or a coating film (c2) yielded by a reaction between the hardener (C) for an epoxy resin and the epoxy resin (E), and is one having a bonding group (x) absorbing infrared ray in a wave number region of 1630 to 1680 $cm^{-1}$, and a bonding group (y) absorbing infrared ray in a wave number region of 1680 to 1725 $cm^{-1}$, at least at the surface.

9) An epoxy resin composition comprising 100 parts by mass of an epoxy resin (J) and 0.1 to 100 parts by mass of an amine hardener comprising at least one kind of a hardener selected from the group consisting of the hardeners according to any one of the above-described 1) to 8), as major components.

10) The epoxy resin composition according to any one of the above-described 5) to 10), comprising 1 to 200 parts by mass of at least one kind of a hardener (K) selected from the group consisting of acid anhydrides, phenols, hydrazides and guanidines, based on 100 parts by mass of said epoxy resin (E).

11) The epoxy resin composition according to any one of the above-described 4) to 10), containing the microcapsule type hardener (D) for an epoxy resin, the epoxy resin (E) and a cyclic borate ester compound (L).

12) The epoxy resin composition according to any one of the above-described 4) to 11), wherein said cyclic borate ester compound (L) is 2,2'-oxybis(5,5'-dimethyl-1,3,2-dioxaborinane).

13) The epoxy resin composition according to any one of the above-described 4) to 12), wherein the formulation amount of said cyclic borate ester compound (L) is 0.001 to 10 parts by mass, based on 100 parts by mass of said epoxy resin (E).

14) Anisotropic conductive material characterized by containing the epoxy resin composition according to any one of the above-described 4) to 13).

15) A film for bonding characterized by containing the epoxy resin composition according to any one of the above-described 4) to 13).

16) Paste for bonding a semiconductor characterized by containing the epoxy resin composition according to any one of the above-described 4) to 13).

17) Sealant characterized by containing the epoxy resin composition according to any one of the above-described 4) to 13).

18) Structural adhesives characterized by containing the epoxy resin composition according to any one of the above-described 4) to 13).

Advantages of the Invention

A hardener for an epoxy resin and an epoxy resin composition of the present invention have effect of satisfying both high hardening property and storage stability, and a hardened substance thereof exerts excellent characteristics in reliability, water resistance, adhesiveness and electric characteristics.

Best Mode for Carrying Out the Invention

The present invention is specifically explained below.

An amine hardener of the present invention contains the amine adduct (A) and the low molecular weight amine compound (B), as major components, and contains these in the specified ratio.

The amine adduct (A) is a compound having an amino group obtainable by a reaction between at least one kind of a compound selected from the group consisting of a carboxylic acid compound, a sulfonic acid compound, an isocyanate compound, a urea compound and the epoxy resin (a1), and the amine compound (b1).

Examples of a carboxylic acid compound, a sulfonic acid compound, an isocyanate compound, a urea compound and the epoxy resin (a1) used as raw material of the amine adduct (A) are shown below:

A carboxylic acid compound includes, for example, succinic acid, adipic acid, sebacic acid, phthalic acid, dimer acid, etc.

A sulfonic acid compound includes, for example, ethanesulfonic acid, p-toluenesulfonic acid, etc.

An isocyanate compound may include, for example, aliphatic diisocyanate, alicyclic diisocyanate, aromatic diisocyanate, aliphatic triisocyanate, polyisocyanate. Examples of an aliphatic diisocyanate may include ethylene diisocyanate, propylene diisocyanate, butylene diisocyanate, hexamethylene diisocyanate, trimethylhexamethylene diisocyanate, etc. Example of alicyclic diisocyanate may include isophorone diisocyanate, 4,4'-dicyclohexylmethane diisocyanate, norbornane diisocyanate, 1,4-isocyanatocyclohexane, 1,3-bis(isocyanatomethyl)-cyclohexane, 1,3-bis(isocyanatopropyl-2-yl)-cyclohexane, etc. Example of aromatic diisocyanate may include tolylene diisocyanate, 4,4'-diphenylmethane diisocyanate, xylene diisocyanate, 1,5-naphthalene diisocyanate, etc. Examples of an aliphatic triisocyanate may include 1,3,6-triisocyanatomethylhexane, 2-isocyanatoethyl 2,6-diisocyanatohexanoate, etc. As polyisocyanate, polymethylenepolyphenyl polyisocyanate or polyisocyanate derived from above mentioned diisocyanate compound is exemplified. Polyisocyanate derived from the above-described diisocyanate includes isocyanurate type polyisocyanate, biuret type polyisocyanate, urethane type polyisocyanate, allophanate type polyisocyanate, carbodiimide type polyisocyanate etc.

A urea compound includes, for example, urea, methylurea, dimethylurea, ethylurea, t-butylurea, etc.

As the epoxy resin (a1), any one of a mono-epoxy compound, a polyvalent epoxy compound, or a mixture thereof may be used. A mono-epoxy compound may include butyl glycidyl ether, hexyl glycidyl ether, phenyl glycidyl ether, allyl glycidyl ether, para-tert-butylphenyl glycidyl ether, ethylene oxide, propylene oxide, paraxylyl glycidyl ether, glycidyl acetate, glycidyl butyrate, glycidyl hexoate, glycidyl benzoate, etc. A polyvalent epoxy compound is exemplified, for example, bisphenol type epoxy resin produced by glycidylation of bisphenols such as bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A, tetrafluorobisphenol A, etc.; epoxy resins produced by glycidylation of other dihydric phenols such as biphenol, dihydroxynaphthalene, 9,9-bis(4-hydroxyphenyl)fluorine, etc.; epoxy resins produced by glycidylation of trihydric phenols such as 1,1,1-tris(4-hydroxyphenyl)methane, 4,4-(1-(4-(1-(4-hydroxyphenyl)-1-methylethyl)phenyl)-ethylidene) bisphenol, etc.; epoxy resins produced by glycidylation of tetrakisphenols such as 1,1,2,2,-tetrakis(4-hydroxyphenyl) ethane, etc.; novolac type epoxy resins produced by glycidylation of novolacs such as phenol novolac, cresol novolac, bisphenol A novolac, brominated phenol novolac, brominated bisphenol A novolac, etc.; epoxy resins produced by glycidylation of polyhydric phenols, aliphatic ether type epoxy resins produced by glycidylation of polyhydric alcohol such as glycerin or polyethylene glycol, etc.; ether-ester type epoxy resins produced by glycidylation of hydroxy carboxylic acid such as p-oxybenzoic acid, β-oxynaphthoic acid, etc.; ester-type epoxy resins produced by glycidylation of polycarboxylic acid such as phthalic acid, terephthalic acid, etc.; glycidylated epoxy resins such as glycidylated compounds of amine compounds such as 4,4-diaminodiphenyl methane or m-aminophenol, or amine type epoxy resins such as triglycidyl isocyanurate, etc.; and alicyclic epoxides such as 3,4-epoxycyclohexylmethyl 3',4'-epoxycyclohexane carboxylate, etc.

Among a carboxylic acid compound, a sulfonic acid compound, an isocyanate compound, a urea compound and the epoxy resin (a1) used as raw material of the amine adduct (A), the epoxy resin (a1) is preferable because of having high hardening property and excellent storage stability.

As the epoxy resin (a1), a polyvalent epoxy compound is preferable because storage stability of an epoxy resin compound can be enhanced. As the polyvalent epoxy compound, a glycidyl type epoxy resin is preferable because productivity of an amine adduct is by far higher, and glycidyl types epoxy resins of polyhydric phenols are more preferable, because of providing a hardened substance with excellent adhesiveness or heat resistance, and a bisphenol type epoxy resin is further preferable. A glycidyl type epoxy resin of bisphenol A and a glycidyl type epoxy resin of bisphenol F are further preferable. A glycidyl type epoxy resin of bisphenol A is further more preferable.

Total chlorine amount of the epoxy resin (a1) is preferably not higher than 1500 ppm, to obtain an epoxy resin composition having good balance between hardening property and storage stability.

The total chlorine amount of the epoxy resin (a1) is more preferably not higher than 1000 ppm, more preferably not higher than 800 ppm, more preferably not higher than 400 ppm, more preferably not higher than 180 ppm, more preferably not higher than 171 ppm, more preferably not higher than 100 ppm, more preferably not higher than 80 ppm, and further preferably not higher than 50 ppm.

In addition, to make control of a shell formation reaction easy, the total chlorine amount is preferably not lower than 0.01 ppm, more preferably not lower than 0.02 ppm, more preferably not lower than 0.05 ppm, more preferably not lower than 0.1 ppm, more preferably not lower than 0.2 ppm, and further preferably not lower than 0.5 ppm. For example, the preferable range of the total chlorine amount is not lower than 0.1 ppm and not higher than 200 ppm, the more preferable range is not lower than 0.2 ppm and not higher than 80 ppm, and the more preferable range is not lower than 0.5 ppm and not higher than 50 ppm. Among the total chlorine, chlorine contained in a 1,2-chlorohydrin group is generally referred to as hydrolysable chlorine, and the amount of hydrolysable chlorine in an epoxy resin used as raw material of an amine adduct is preferably not higher than 50 ppm, more preferably 0.01 to 20 ppm, and further preferably 0.05 to 10 ppm. The amount of hydrolysable chlorine not higher than 50 ppm is advantageous in providing both high hardening property and storage stability, and preferable due to showing excellent electric characteristics.

These epoxy resins may be used alone or in combination.

The amine compound (b1) includes a compound having at least one primary amino group and/or secondary amino group but not having a tertiary amino group, and a compound having at least one tertiary amino group and at least one active hydrogen group.

Compounds having at least one primary amino group and/or secondary amino group, but having no tertiary amino group may include, primary amines hot having a tertiary amino group, for example, methylamine, ethylamine, propylamine, butylamine, ethylenediamine, propylenediamine, hexamethylenediamine, diethylenetriamine, triethylenetetraamine, ethanolamine, propanolamine, cyclohexylamine, isophoronediamine, aniline, toluidine, diaminodiphenylmethane, diaminodiphenyl sulfone; and secondary amines not having a tertiary amino group, for example, dimethylamine, diethylamine, dipropylamine, dibutylamine, dipentylamine, dihexylamine, dimethanolamine, diethanolamine, dipropanolamine, dicyclohexylamine, piperidine, piperidone, diphenylamine, phenylmethylamine, phenylethylamine, etc.

In compounds having at least one tertiary amino group and at least one active hydrogen group, the active hydrogen group is exemplified by a primary amino group, a secondary amino group, a hydroxyl group, a thiol group, a carboxylic acid, and a hydrazide group.

Compounds having at least one tertiary amino group and one active hydrogen group may include, for example, amino alcohols, such as, 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, methyldiethanolamine, triethanolamine, N-β-hydroxyethylmorpholine, etc.; aminophenols such as 2-(dimethylaminomethyl)phenol, 2,4,6-tris(dimethylaminomethyl)phenol, etc.; imidazoles such as 2-methylimidazole, 2-ethyl-4-methylimidazole, 2-undecylimidazole, 2-heptadecylimidazole, 2-phenylimidazole, 1-aminoethyl-2-methylimidazole, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, etc.; imidazolines such as 1-(2-hydroxy-3-phenoxypropyl)-2-phenylimidazoline, 1-(2-hydroxy-3-butoxypropyl)-2-methylimidazoline, 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, 1,4-phenylene-bis-4-methylimidazoline, etc.; tertiary aminoamines such as dimethylaminopropylamine, diethylaminopropylamine, dipropylaminopropylamine, dibutylaminopropylamine, dimethylaminoethylamine, diethylaminoethylamine, dipropylaminoethylamine, dibutylaminoethylamine, N-methylpiperazine, N-aminoethylpiperazine, diethylaminoethylpiperazine, etc.; aminomercaptans such as 2-dimethylaminoethanethiol, 2-mercaptobenzimidazole, 2-mercaptobenzothiazole, 2-mercaptopyridine, 4-mercaptopyridine, etc.; amino carboxylic acids such as N,N-dimethylaminobenzoic acid, N,N-dimethylglycin, nicotinic acid, isonicotinic acid, picolinic acid, etc.; and amino hydrazides such as N,N-dimethylglycin hydrazide, nicotinic acid hydrazide, isonicotinic acid hydrazide, etc.

As the amine compound (b1), a compound having at least one tertiary amino group and at least one active hydrogen group is preferable because of having excellent balance between storage stability and hardening property, and imidazols are further preferable, and 2-methylimidazole and 2-ethyl-4-methylimidazole are further more preferable.

In the present invention, it was found out that hardening property of a one component epoxy resin composition can dramatically be improved by limiting the molecular weight distribution of the amine adduct (A) within the specified range.

Namely, the molecular weight distribution of the amine adduct (A) used in the present invention is 3 or lower. The molecular weight distribution is defined by the ratio of the weight average molecular weight and the number average molecular weight, and calculated from the molecular weight determined by gel permeation chromatography (hereinafter referred to as GPC). The molecular weight distribution of the amine adduct (A) is preferably not lower than 1.01 and not higher than 2.5, further preferably not lower than 1.03 and not higher than 2.0, and far more preferably not lower than 1.05 and not higher than 1.5. By using the amine adduct (A) having a molecular weight distribution of not higher than 3, an epoxy resin composition with high hardening property can be obtained.

The amine adduct (A) used in the present invention can be obtained by subjecting, for example, the epoxy resin (a1) and the amine compound (b1), in such a range as an active hydrogen group in the amine compound (b1) is preferably 0.8 equivalent to 5 equivalents (further preferably 0.9 equivalent to 4 equivalents and far more preferably 0.9 equivalent to 3 equivalents), based on 1 equivalent of an epoxy group of the epoxy resin (a1), if necessary, in the presence of a solvent, to a reaction, for example, at a temperature of 50 to 250° C. for 0.1 to 10 hours. The equivalent ratio of the active hydrogen group, based on the epoxy group, not lower than 0.8 is advantageous to yield the amine adduct (A) with a molecular weight distribution of not lower than 3, while the equivalent ratio of not higher than 5 is advantageous to economically recover unreacted amine compound (b1), which recovery is carried out to bring the content of the amine compound (b1) contained in amine hardener of the present invention, to desirable value.

In producing the amine adduct (A), a solvent used when needed is not especially limited, and includes, for example, hydrocarbons such as benzene, toluene, xylene, cyclohexane, mineral sprit, naphtha, etc.; ketones such as acetone, methyl ethyl ketone, methyl isobutyl ketone, etc.; esters such as ethyl acetate, n-butyl acetate, propylene glycol mono methyl ether acetate, etc.; alcohols such as methanol, isopropanol, n-butanol, butylcellosolve, butylcarbitol, etc.; and water, and the like. These solvents may be used in combination. A solvent used is preferably removed by distillation, and the like.

The low molecular weight amine compound (B) used in the present invention includes a compound having a primary amino group, a secondary amino group and/or a tertiary amino group. They may be used in combination.

Compounds having a primary amino group may include, for example, methylamine, ethylamine, propylamine, butylamine, ethylenediamine, propylenediamine, hexamethylenediamine, diethylenetriamine, triethylenetetraamine, ethanolamine, propanolamine, cyclohexylamine, isophoronediamine, aniline, toluidine, diaminodiphenylmethane, diaminodiphenyl sulfone, etc.

Compounds having a secondary amino group may include, for example, dimethylamine, diethylamine, dipropylamine, dibutylamine, dipentylamine, dihexylamine, dimethanolamine, diethanolamine, dipropanolamine, dicyclohexylamine, piperidine, piperidone, diphenylamine, phenylmethylamine, phenylethylamine, etc.

Compounds having a tertiary amino group may include, for example, tertiary amines such as trimethylamine, triethylamine, benzyldimethylamine, N,N'-dimethylpiperazine, triethylenediamine, 1,8-diazabicyclo[5.4.0]-undecene-7,1,5-diazabicyclo[4.3.0]-nonene-5, etc.; aminoalcohols such as 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, methyldiethanolamine, triethanolamine, N-β-hydroxyethylmorpholine, etc.; aminophenols such as 2-(dimethylaminomethyl)phenol, 2,4,6-tris(dimethylaminomethyl)phenol, etc.; imidazoles such as 2-methylimidazole, 2-ethyl-4-methylimidazole, 2-undecylimidazole, 2-heptadecylimidazole, 2-phenylimidazole, 1-aminoethyl-2-methylimidazole, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, etc.; imidazolines such as 1-(2-hydroxy-3-phenoxypropyl)-2-phenylimidazoline, 1-(2-hydroxy-3-butoxypropyl)-2-methylimidazoline, 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, 1,4-phenylene-bis-4-methylimidazoline, etc.; tertiary aminoamines such as dimethylaminopropylamine, diethylaminopropylamine, dipropylaminopropylamine, dibutylaminopropylamine, dimethylaminoethylamine, diethylaminoethylamine, dipropylaminoethylamine, dibutylaminoethylamine, N-methylpiperazine, N-aminoethylpiperazine, diethylaminoethylpiperazine, etc.; aminomercaptans such as 2-dimethylaminoethanethiol, 2-mercaptobenzimidazole, 2-mercaptobenzothiazole, 2-mercaptopyridine, 4-mercaptopyridine, etc.; amino carboxylic acids such as N,N-dimethylaminobenzoic acid, N,N-dimethylglycin, nicotinic acid, isonicotinic acid, picolinic acid, etc.; and aminohydrazides such as N,N-dimethylglycin hydrazide, nicotinic acid hydrazide, isonicotinic acid hydrazide, etc.

As the low molecular weight amine compound (B), a compound having a tertiary amino group is preferable because of yielding a one component epoxy resin composition excellent in storage stability, and imidazoles are further preferable, and 2-methylimidazole and 2-ethyl-4-methylimidazole are far more preferable.

The present inventors have found out that a one component epoxy resin composition having high storage stability can be obtained by containing a low molecular weight amine compound in the specified amount in the amine adduct (A).

Namely, in the present invention, the amount of the low molecular weight amine compound (B), based on 100 parts by mass of the amine adduct (A), is in a range of not lower than 0.001 part by mass and not higher than 1 part by mass, preferably not lower than 0.001 part by mass and not higher than 0.8 part by mass, more preferably not lower than 0.002 part by mass and not higher than 0.6 part by mass, and far more preferably not lower than 0.003 part by mass and not higher than 0.4 part by mass.

The low molecular weight amine compound (B) may be mixed into the amine adduct (A) after production of the amine adduct (A), or may be mixed before and/or during production of the amine adduct (A). In addition, the unreacted product of the amine compound (b1), as raw material of the amine adduct (A), may be used as the low molecular weight amine compound (B).

Total chlorine amount of an amine hardener of the present invention is preferably not higher than 1500 ppm, more preferably not higher than 1000 ppm, more preferably not higher than 800 ppm, more preferably not higher than 400 ppm, more preferably not higher than 180 ppm, more preferably not higher than 171 ppm, more preferably not higher than 100 ppm, more preferably not higher than 800 ppm, and further preferably not higher than 50 ppm. Total chlorine amount of not higher than 1500 ppm is capable of providing an epoxy resin composition having high balance between hardening property and storage stability.

As a form of an amine hardener, it is preferable to be solid state at 25° C., namely softening point to be over 25° C., more preferably softening point is not lower than 40° C., still more preferably softening point is not lower than 60° C., still more preferably softening point is not lower than 70° C. By using an amine hardener which is solid state at 25° C., an epoxy resin composition having high storage stability can be obtained.

As a solid state amine hardener, further, block state, granule state and powder state and the like are included, and granule state or powder state is preferable, and powder state is further preferable. "Powder state" in the present invention is not especially limited, however, an average particle diameter of 0.1 to 50 μm is preferable, and an average particle diameter of 0.5 to 10 μm is further preferable. By setting an average particle diameter of not larger than 50 μm, a homogeneous hardened substance can be obtained. "Particle diameter" referred to in the present invention indicates Stokes diameter measured by a light scattering method. In addition, "average particle diameter" indicates median diameter. In addition, particle shape is not especially limited, and any of spherical and indeterminate form may be allowed, and spherical form is preferable to lower viscosity of a one component epoxy resin composition. "Spherical form" here includes indeterminate shape with round corner, in addition to true sphere.

The microcapsule type hardener (D) for an epoxy resin described in the present invention is one having such structure that a core surface comprising a hardener (C) for an epoxy resin is coated with a shell comprising a synthetic resin or an inorganic oxide. Among these, a synthetic resin is preferable in view of film stability and easy destruction thereof in heating, and uniformity of a hardened substance.

A synthetic resin includes an epoxy rein, a polyester resin, a polyethylene resin, a nylon resin, a polystyrene resin, a urethane rein, and the like, and preferably a urethane resin as an addition product of mono or polyhydric alcohol and mono or polyisocyanate; and a reaction product of an amine type hardener and an epoxy resin; and a phenolic resin, and among these, a reaction product between an amine hardener and an epoxy resin is preferable in view of film stability and easy destruction thereof in heating.

As an example of an inorganic oxide, a boron compound such as boron oxide and a borate ester, silicon dioxide and calcium oxide are included, and boron oxide is preferable in view of film stability and easy destruction thereof in heating.

In addition, in the case where the hardener for an epoxy resin (C) of the present invention is used as the core, one having a bonding group (x) absorbing infrared ray in a wave number region of 1630 to 1680 cm$^{-1}$, and a bonding group (y) absorbing infrared ray in a wave number region of 1680 to 1725 cm$^1$, at least at the surface, is preferable in view of balance between storage stability and reactivity.

The bonding group (x) and the bonding group (y) can be measured using a Fourier transform type infrared spectrometer (hereinafter referred to as FT-IR). In addition, presence of the bonding group (x) and/or the bonding group (y) at least at the surface of the hardener (C) for an epoxy resin can be measured using a microscopic FT-IR.

Among the bonding group (x), as a particularly useful one, a urea bond is included. Among the bonding group (y), as a particularly useful one, a biuret bond is included.

One having the urea bond and the biuret bond is the coated film (c1) formed by a reaction between an isocyanate compound (H) and an active hydrogen compound (I)

As the isocyanate compound (H) used to form the urea bond, as a representative of the bonding group (x), and the biuret bond, as a representative of the bonding group (y), any compound may be used as long as having 1 or more isocyanate groups in 1 molecule, and preferably a compound having 2 or more isocyanate groups in 1 molecule. Preferable isocyanates may include an aliphatic diisocyanate, an alicyclic diisocyanate, an aromatic diisocyanate, a low molecular weight triisocyanate, and a polyisocyanate. Examples of an aliphatic diisocyanate may include ethylene diisocyanate, propylene diisocyanate, butylene diisocyanate, hexamethylene diisocyanate, trimethylhexamethylene diisocyanate, etc. Examples of an alicyclic diisocyanate may include isophorone diisocyanate, 4,4'-dicyclohexylmethane diisocyanate, norbornane diisocyanate, 1,4-diisocyanatocyclohexane, 1,3-bis(isocyanatomethyl)-cyclohexane, 1,3-bis(2-isocyanatopropyl-2-yl)-cyclohexane, etc. Examples of an aromatic diisocyanate may include tolylene diisocyanate, 4,4'-diphenylmethane diisocyanate, xylene diisocyanate, 1,5-naphthalene diisocyanate, etc. Examples of a low molecular weight triisocyanates may include aliphatic triisocyanate compounds such as 1,6,11-undecane triisocyanate, 1,8-diisocyanato-4-isocyanatomethyloctane, 1,3,6-hexamethylene triisocyanate, 2-isocyanatoethyl 2,6-diisocyanatohexanoate, 1-methyl-2-isocyanatoethyl 2,6-diisocyanatohexanoate, etc.; alicyclic triisocyanate compounds such as tricyclohexylmethane triisocyanate, bicycloheptane triisocyanate, etc.; and aromatic triisocyanate compounds such as triphenylmethane triisocyanate, tris(isocyanatophenyl)thiophophate, etc.; A polyisocyanate is exemplified by polymethylene polyphenyl polyisocyanate, or polyisocyanate derived from the above-described diisocyanate or a low molecular weight triisocyanate. A polyisocyanate derived from the above-described diisocyanate or triisocyanate includes isocyanurate type polyisocyanate, biuret type polyisocyanate, urethane type polyisocyanate, allophanate type polyisocyanate, carbodiimide type polyisocyanate, etc.

These isocyanate compounds (H) may be used in combination.

As the isocyanate compound (H), an aliphatic triisocyanate compound is preferable, and 1,8-diisocyanato-4-isocyanatomethyloctane, and 2-isocyanatoethyl 2,6-diisocyanatohexanoate are more preferable.

As the active hydrogen compound (I) to form the urea bond, as a representative of the bonding group (x), and the biuret bond, as a representative of the bonding group (y), water, a compound having 1 or more primary and/or secondary amino groups in 1 molecule, and a compound having 1 or more hydroxyl groups in 1 molecule are exemplified. These compounds may also be used in combination. Water or a compound having 1 or more hydroxyl groups in 1 molecule is preferable. As a compound having 1 or more primary and/or secondary amino groups in 1 molecule, an aliphatic amine, an alicyclic amine and an aromatic amine can be used. Examples of an aliphatic amine may include alkylamines such as methylamine, ethylamine, propylamine, butylamine, dibutylamine, etc.; alkylene diamines such as ethylene diamine, propylene diamine, butylene diamine, hexamethylene diamine, etc.; polyalkylene polyamines such as diethylene triamine, triethylene tetraamine, tetraethylene pentaamine, etc.; and polyoxyalkylene polyamines such as polyoxypropylene diamine, polyoxyethylene diamine, etc. Examples of alicyclic amine may include cyclopropyl amine, cyclobutyl amine, cyclopentyl amine, cyclohexyl amine, isophorone diamine, etc. Aromatic amines may include aniline, toluidine, benzylamine, naphthylamine, diaminodiphenylmethane, diaminodiphenyl sulfone, etc.

As a compound having 1 or more hydroxyl groups in 1 molecule, used as the active hydrogen compound (I), an alcohol compound and a phenol compound are exemplified. Alcohol compounds may include monohydric alcohols such as methyl alcohol, propyl alcohol, butyl alcohol, amyl alcohol, hexyl alcohol, heptyl alcohol, octyl alcohol, nonyl alcohol, decyl alcohol, undecyl alcohol, lauryl alcohol, dodecyl alcohol, stearyl alcohol, eicosyl alcohol, allyl alcohol, crotyl alcohol, propargyl alcohol, cyclopentanol, cyclohexanol, benzylalcohol, cinnamyl alcohol, ethylene glycol monomethyl ether, ethylene glycol monoethyl ether, ethylene glycol monoethyl ether, diethylene glycol monobutyl ether; and polyhydric alcohols such as ethylene glycol, polyethylene glycol, propylene glycol, polypropylene glycol, 1,3-butanediol, 1,4-butanediol, hydrogenated bisphenol A, neopentylglycol, glycerin, trimethylol propane, pentaerythritol, etc. In addition, compounds having 2 or more secondary hydroxyl groups in 1 molecule, obtainable by a reaction between a compound having 1 or more epoxy groups in 1 molecule, and a compound having at 1 or more hydroxyl groups, carboxyl groups, primary or secondary amino groups, or mercapto groups in 1 molecule are also exemplified as polyhydric alcohols. These alcohol compounds may be any of primary, secondary or tertiary alcohols. Phenol compounds may include monohydric phenols such as phenol, cresol, xylenol, carvacrol, thymol, naphthol, etc.; and polyhydric phenols such as catechol, resorcin, hydroquinone, bisphenol A, bisphenol F, pyrogallol, phloroglucin, etc. As compounds having 1 or more hydroxyl groups in 1 molecule, polyhydric alcohols or polyhydric phenols, and the like are preferable. Polyhydric alcohols are further preferable.

At the surface of the core comprising the hardener (C) for an epoxy resin, the bonding group (x) and the bonding group (y) are preferably present each in a concentration range of 1 to 1000 meq/kg. "Concentration" here is the value based on the hardener (C) for an epoxy resin. The concentration of the bonding group (x) not lower than 1 meq/kg is advantageous to obtain a capsule type hardener having high resistance to mechanical shear force. In addition, the concentration of the bonding group (x) not higher than 1000 meq/kg is advantageous to obtain high hardening property. Further preferable concentration range of the bonding group (x) is 10 to 300 meq/kg.

The concentration of the bonding group (y) not lower than 1 meq/kg is advantageous to obtain a capsule type hardener having high resistance to mechanical shear force. In addition, the concentration of the bonding group (y) not higher than 1000 meq/kg is advantageous to obtain high hardening property. Further preferable concentration range of the bonding group (y) is 10 to 200 meq/kg.

In addition, the surface of the core comprising the hardener (C) for an epoxy resin preferably has the bonding group (z) absorbing infrared ray in a wave number region of 1730 to 1755 $cm^{-1}$, along with the bonding group (x) and the bonding group (y). The bonding group (z) cal also be measured by a Fourier transform type infrared spectrometer (FT-IR). In addition, presence of the bonding group (z) at least at the surface of the hardener (C) for epoxy resin can be measured using a micro FT-IR.

Among the bonding group (z), particularly useful one is a urethane bond. This urethane bond is formed by a reaction between the isocyanate compound (H) and a compound having 1 or more hydroxyl groups in 1 molecule. As the isocyanate compound (H) used here, the isocyanate compound (H) used to form the urea bond or the biuret bond can be used.

As a compound having 1 or more hydroxyl groups in 1 molecule used to form a urethane bond, as a representative of the bonding group (z), alcohol compounds such as aliphatic saturated alcohols, aliphatic unsaturated alcohols, alicyclic alcohols, and aromatic alcohols, and phenol compounds can be used. Aliphatic alcohols may include monohydric alcohols such as methyl alcohol, propyl alcohol, butyl alcohol, amyl alcohol, hexyl alcohol, heptyl alcohol, octyl alcohol, nonyl alcohol, decyl alcohol, undecyl alcohol, lauryl alcohol, dodecyl alcohol, stearyl alcohol, eicosyl alcohol, etc.; ethylene glycol monoalkyl ethers such as ethylene glycol monomethyl ether, ethylene glycol monoethyl ether, ethylene glycol monobutyl ether, ethylene glycol monohexyl ether, etc.; dihydric alcohols such as ethylene glycol, polyethylene glycol, propylene glycol, polypropylene glycol, 1,3-butanediol, neopentylglycol, etc.; trihydric alcohols such as glycerin, trimethylol propane, etc.; tetrahydric alcohols such as pentaerythritol, etc. Aliphatic unsaturated alcohols may include allyl alcohol, crotyl alcohol, propargyl alcohol, etc. Alicyclic alcohols may include cyclopentanol, cyclohexanol, cyclohexane dimethanol, etc. Aromatic alcohols may include monohydric alcohol such as benzyl alcohol, cinnamyl alcohol, etc. These alcohols may be any of a primary, secondary or tertiary alcohol. In addition, compounds having 1 or more secondary hydroxyl groups in 1 molecule, obtained by a reaction between a compound having 1 or more epoxy groups and a compound having 1 or more hydroxyl groups, carboxyl groups, primary or secondary amino groups, or mercapto groups in 1 molecule, can also be used as an alcohol compound. Phenol compounds may include monohydric phenol such as phenol, cresol, xylenol, carvacrol, thymol, naphthol, etc.; dihydric phenol such as catechol, resorcin, hydroquinone, bisphenol A, bisphenol F, etc.; and trihydric phenol such as pyrogallol, phloroglucin, etc. Preferable one as these compounds having 1 or more hydroxyl groups in 1 molecule is an alcohol compound or a phenol compound having 2 or more hydroxyl groups.

Preferable concentration range of the bonding group (z) at the surface of the core comprising the hardener (C) for an epoxy resin is 1 to 200 meq/kg. "Concentration" here is the value based on the hardener (C) for an epoxy resin. The concentration of the bonding group (z) not lower than 1 meq/kg is advantageous to obtain a capsule type hardener having high resistance to mechanical shear force. In addition, the concentration not higher than 200 meq/kg is advantageous to obtain high hardening property. Further preferable concentration range of the bonding group (z) is 5 to 100 meq/kg. Quantitative concentration determination of the bonding group (x), the bonding group (y) and the bonding group (z) can be carried out by a method disclosed in Patent Document 1.

Total thickness of a region where the bonding group (x), the bonding group (y) and the bonding group (z) are present at the surface of the core comprising the hardener (C) for an epoxy resin is preferably 5 to 1000 nm as average layer thickness. The thickness not lower than 5 nm can provide storage stability, while the thickness not higher than 1000 nm can provide practical hardening property. "Layer thickness" here can be measured by a transmission electron microscope. Particularly preferable total thickness of the bonding group at the surface of the core comprising the hardener (C) for an epoxy resin is 10 to 100 nm as average layer thickness.

Ratio of the bonding group at said surface based on the core comprising the hardener (C) for an epoxy resin is 100/1 to 100/100 in mass ratio. This range can provides both storage stability and hardening property. The ratio is preferably 100/2 to 100/80, more preferably 100/5 to 100/60, and far preferably 100/10 to 100/50.

As a method for making presence of the bonding group at the surface of the core comprising the hardener (C) for an epoxy resin, the following methods are included: a method for dissolving a component of the bonding group, and decreasing solubility of the component of the bonding group in a dispersing medium wherein the hardener (C) for an epoxy resin is dispersed, to deposit the bonding group at said surface of the hardener (C) for an epoxy resin; and a method for carrying out a reaction for formation of the bonding group in a dispersing medium, wherein the hardener (C) for an epoxy resin is dispersed, to deposit the bonding group at said surface of the hardener (C) for an epoxy resin, or a method for utilization of the surface of the hardener (C) for an epoxy resin as a reaction field to form the bonding group therein. The latter methods are preferable because the reaction and coating can simultaneously be carried out.

As a dispersing medium here, a solvent, a plasticizer, resins, and the like are exemplified. In addition, an epoxy resin can also be used as a dispersing medium.

As solvents, for example, hydrocarbons such as benzene, toluene, xylene, cyclohexane, mineral sprit, naphtha, etc.; ketones such as acetone, methyl ethyl ketone, methyl isobutyl ketone, etc.; esters such as ethyl acetate, n-butyl acetate, propylene glycol monomethyl ether acetate, etc.; alcohols such as methanol, isopropanol, n-butanol, butylcellosolve, butylcarbitol, etc.; and water are exemplified. As plasticizers, phthalic acid diester types such as dibutyl phthalate, di(2-ethylhexyl) phthalate, etc.; aliphatic dibasic acid diester types such as di(2-ethylhexyl) adipate, etc.; phosphoric acid triester types such as tricresyl phosphate, etc.; glycol ester types such as polyethylene glycol ester, etc. are exemplified. As resins, silicone resins, epoxy resins, phenolic resins, etc. are exemplified.

In a method for coating the hardener (C) for an epoxy resin with the bonding group, an epoxy resin usable as a dispersing medium is exemplified by, for example, bisphenol type epoxy resins produced by glycidylation of bisphenols such as such as bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A, tetrafluorobisphenol A, etc.; epoxy resins produced by glycidylation of other dihydric phenols such as biphenol, dihydroxynaphthalene, dihydroxybenzene, 9,9-bis(4-hydroxyphenyl)fluorene, etc.; epoxy resins produced by glycidylation of trihydric phenols such as 1,1,1-tris(4-hydroxyphenyl)methane, 4,4-(1-(4-(1-(4-hydroxyphenyl)-1-methylethyl)phenyl)-ethylidene)bisphenol, etc.; epoxy resins produced by glycidylation of tetrakisphenols such as 1,1,2,2,-tetrakis(4-hydroxyphenyl)ethane, etc.; epoxy resins produced by glycidylation of polyhydric phenols exemplified as novolac type epoxy resin produced by glycidylation of novolacs such as phenol novolac, cresol novolac, bisphenol A novolac, brominated phenol novolac, brominated bisphenol A novolac, etc.; aliphatic ether type epoxy resins produced by glycidylation of polyhydric alcohol such as glycerin or polyethylene glycol, etc.; ether-ester type epoxy resins produced by glycidylation of hydroxy carboxylic acid such as p-oxybenzoic acid, β-oxynaphthoic acid, etc.; ester-type epoxy resins produced by glycidylation of polycarboxylic acid such as phthalic acid, terephthalic acid, etc.; glycidylated epoxy resins, for example, glycidylated compounds of amino compounds such as 4,4-diaminodiphenyl methane, m-aminophenol, etc., or amine type epoxy resins such as triglycidyl isocyanurate, etc.; and alicyclic epoxides such as 3,4-epoxycyclohexylmethyl 3',4'-epoxycyclohexane carboxylate, etc.

Among these, a glycidyl type epoxy resin is preferable because of providing an epoxy resin composition with high storage stability, and more preferable ones are glycidyl type epoxy resins of polyhydric phenols because of providing a hardened substance with excellent adhesiveness and heat resistance, and further preferable one is a bisphenol type epoxy resin. A glycidyl type epoxy resin of bisphenol A and a glycidyl type epoxy resin of bisphenol F are further preferable. A glycidyl type epoxy resin of bisphenol A is further more preferable.

In a method for utilization of the surface of the hardener (C) for an epoxy resin as a reaction field to form the bonding group therein, a reaction between the isocyanate compound (H) and the active hydrogen compound (I) is carried out usually at a temperature range of –10° C. to 150° C. for a reaction time of 10 minutes to 12 hours.

Mass ratio of the isocyanate compound (H) and the active hydrogen compound (I) is not especially limited, however, equivalent ratio of the isocyanate group in the isocyanate compound (H) and the active hydrogen in the active hydrogen compound (I) is in a range of 1:0.1 to 1:1000.

A reaction where the coating film (c2) comprising a reaction product between the hardener (C) for an epoxy resin and the epoxy resin (E) is used as the shell of the micro capsule type hardener (D) for an epoxy resin described in the present invention, is carried out usually at a temperature range of 10° C. to 150° C., preferably 0° C. to 100° C. for a reaction time of 1 to 168 hours, preferably 2 to 72 hours, and may also be carried out in a dispersing medium. As the dispersing medium, a solvent, a plasticizer, and the like are exemplified. In addition, the epoxy resin (E) itself may be used as a dispersing medium.

Solvents are exemplified by, for example, hydrocarbons such as benzene, toluene, xylene, cyclohexane, mineral sprit, naphtha, etc.; ketones such as acetone, methyl ethyl ketone, methyl isobutyl ketone, etc.; esters such as ethyl acetate, n-butyl acetate, propylene glycol monomethyl ether acetate, etc.; alcohols such as methanol, isopropanol, n-butanol, butylcellosolve, butylcarbitol, etc.; and water. Plasticizers are exemplified by phthalic acid diester types such as dibutyl phthalate, di(2-ethylhexyl) phthalate or aliphatic dibasic acid diester type such as di(2-ethylhexyl) adipate, etc.; phosphoric acid triester types such as tricresyl phosphate, etc.; and glycol ester types such as polyethylene glycol ester, etc.

Mass ratio in subjecting the hardener (C) for an epoxy resin and the epoxy resin (E) to a reaction is not especially limited, however, usually in a range of 1:0.001 to 1:1000, preferably in a range of 1:0.01 to 1:100.

As a method for coating the core comprising the hardener (C) for an epoxy resin with the coating film (c2), the following methods are included: a method for dissolving the coating film (c2), and decreasing solubility of the coating film (c2) in a dispersing medium, wherein the hardener (C) for an epoxy resin is dispersed, to deposit the coating film (c2) at said surface of the hardener (C) for an epoxy resin; and a method for carrying out a reaction for formation of the coating film (c2) in a dispersing medium, wherein the hardener (C) for an epoxy resin is dispersed, to deposit the coating film (c2) at said surface of the hardener (C) for an epoxy resin, or a method for utilizing the core surface comprising the hardener (C) for an epoxy resin as a reaction field to form the coating film (c2) therein. The latter two methods are preferable because the reaction and coating can simultaneously be carried out.

In addition, as the amine hardener of the present invention in the latter method, the hardener for an epoxy resin in the core may be used, or different one may be added.

Thickness of the coating film (c2) of the shell for coating the surface of the hardener (C) for an epoxy resin of the present invention is preferably 5 to 1000 nm as average layer thickness. The thickness not lower than 5 nm can provide storage stability, while the thickness not higher than 1000 nm can provide practical hardening property. "Layer thickness" here can be observed by a transmission electron microscope. Particularly preferable shell thickness is 50 to 700 nm as average layer thickness.

In addition, the highly soluble epoxy resin (G) contained in the epoxy resin (E) of the present invention is characterized in having a solubility parameter of 8.900 to 12.00. The solubility parameter larger than 12.00 lowers water resistance of a hardened substance, while the solubility parameter smaller than 8.900 lowers hardening property of an epoxy resin composition. From such a view point, the solubility parameter of the highly soluble epoxy resin (G) is preferably 8.95 to 9.5, more preferably 9.00 to 9.16, particularly preferably 9.05 to 9.15, and further preferably 9.10 to 9.14.

In addition, the solubility parameter of the highly soluble epoxy resin (G) contained in the epoxy resin (E) of the present invention can be determined by substituting parameters shown in Table 1, which are for structures formed by direct bonding of terminal carbon atoms to other molecules, and hydroxyl groups formed by oxygen atoms, after cleavage of bonding between the terminal carbon and the oxygen atom of the epoxy group in fundamental structure of said epoxy resin, into the following equation (1).

[Expression 1]

$$SP \text{ value} = \text{Total value of "}Fi\text{"s/molecular weight} \quad \text{Equation (1)}$$

[Table 1]

TABLE 1

| Structure | Fi |
|---|---|
| —CH$_3$ | 147.3 |
| —CH$_2$— | 131.5 |
| >CH— | 85.99 |

TABLE 1-continued

| Structure | Fi |
|---|---|
| >C< | 38.52 |
| CH$_2$= | 126.54 |
| —CH= | 121.53 |
| >C= | 84.51 |
| —CH= (aromatic ring) | 117.12 |
| —C= (aromatic ring) | 98.12 |
| —O— (ether, acetal) | 114.98 |
| —O— (epoxy) | 176.20 |
| —COO— | 326.58 |
| >C=O | 262.96 |
| —CHO | 292.64 |
| (CO)$_2$O | 567.29 |
| —OH | 225.84 |
| —H (acidic) | −50.47 |
| —OH (aromatic ring) | 170.99 |
| —NH$_2$ | 226.56 |
| —NH— | 180.03 |
| C≡N | 254.56 |
| —NCO | 358.66 |
| —S— | 209.42 |
| C 12 | 342.67 |
| Cl, primary | 205.06 |
| Cl, secondary | 208.27 |
| Cl, | 161.0 |
| Br | 257.8 |
| Br, aromatic ring | 205.60 |
| F | 41.33 |

Examples of such highly soluble epoxy resin (G) may include glycidylated compounds of 1,2-dihydroxybenzene, 1,3-dihydroxybenzene, 1,4-dihydroxybenzene, 3-methyl-1,2-dihydroxybenzene, 4-methyl-1,2-dihydroxybenzene, 2-methyl-1,3-dihydroxybenzene, 4-methyl-1,3-dihydroxybenzene, 2-methyl-1,4-dihydroxybenzene, 3-ethyl-1,2-dihydroxybenzene, 4-ethyl-1,2-dihydroxybenzene, 2-ethyl-1,3-dihydroxybenzene, 4-ethyl-1,3-dihydroxybenzene, 2-ethyl-1,4-dihydroxybenzene, 3-propyl-1,2-dihydroxybenzene, 4-propyl-1,2-dihydroxybenzene, 2-propyl-1,3-dihydroxybenzene, 4-propyl-1,3-dihydroxybenzene, 2-propyl-1,4-dihydroxybenzene, 3-isopropyl-1,2-dihydroxybenzene, 4-isopropyl-1,2-dihydroxybenzene, 2-isopropyl-1,3-dihydroxybenzene, 4-isopropyl-1,3-dihydroxybenzene, 2-isopropyl-1,4-dihydroxybenzene, 3-tert-butyl-1,2-dihydroxybenzene,4-tert-butyl-1,2-dihydroxybenzene, 2-tert-butyl-1,3-dihydroxybenzene, 4-tert-butyl-1,3-dihydroxybenzene, 2-tert-butyl-1,4-dihydroxybenzene, 3-butyl-1,2-dihydroxybenzene, 4-butyl-1,2-dihydroxybenzene, 2-butyl-1,3-dihydroxybenzene, 4-butyl-1,3-dihydroxybenzene, 2-butyl-1,4-dihydroxybenzene, 1,2-dihydroxynaphthalene, 1,3-dihydroxynaphthalene, 1,4-dihydroxynaphthalene, 1,6-dihydroxynaphthalene, 1,7-dihydroxynaphthalene, 1,8-dihydroxynaphthalene, 2,3-dihydroxynaphthalene, 2,4-dihydroxynaphthalene, 2,6-dihydroxynaphthalene 2,7-dihydroxynaphthalene, and 1,8-dihydroxynaphthalene. Among these, 1,3-dihydroxybenzene, 2-methyl-1,4-dihydroxybenzene, 2-tert-butyl-1,4-dihydroxybenzene, etc. are preferable.

In addition, it is preferable that impurity components at the diol terminals of the highly soluble epoxy resin (G) contained in the epoxy resin (E) of the present invention are equivalent to 0.001 to 30% of the fundamental structure component of the highly soluble epoxy resin.

In the present specification, "the impurity components at the diol terminals" means those with structure (diol structure) where at least one of the epoxy groups has an OH group, compared with the fundamental structure component of the highly soluble epoxy resin having epoxy groups at both terminals.

When the ratio of the impurity components at the diol terminals of the highly soluble epoxy resin (G) to the fundamental structure component of the highly soluble epoxy resin is larger than 30%, water resistance of a hardened substance could be lowered, while the ratio is smaller than 0.001%, hardening property of an epoxy resin composition could be lowered. From such a view point, the ratio of the impurity components at the diol terminals of the highly soluble epoxy resin (G) to the fundamental structure component of the highly soluble epoxy resin is preferably 0.01 to 25%, more preferably 0.1% to 20%, particularly preferably 1.0% to 15%, and further preferably 10% to 14%.

The ratio of the impurity components at the diol terminals of the highly soluble epoxy resin (G) contained in the epoxy resin (E) of the present invention to the fundamental structure component of the highly soluble epoxy resin can be determined by a method described in the item of Example.

In addition, molecular weight between crosslinked points after hardening of the highly soluble epoxy resin (G) contained in the epoxy resin (E) of the present invention is characterized to be 105 to 150. The molecular weight between crosslinked points larger than 150 results in low heat resistance of a hardened substance or small shrinkage during hardening, which causes insufficient adhesive strength between substrates to be adhered, while the molecular weight smaller than 105 provides a brittle hardened substance. From such a view point, the molecular weight between crosslinked points after hardening of the highly soluble epoxy resin (G) contained in the epoxy resin (E) of the present invention is preferably 107 to 145, more preferably 108 to 140, further preferably 109 to 130, and particularly preferably 110 to 120.

The molecular weight between crosslinked points after hardening of the highly soluble epoxy resin (G) is specified as value obtained by molecular weight of a monomer having the fundamental structure formula of an epoxy resin divided by number of epoxy groups contained in the fundamental structure formula.

An epoxy resin composition of the present invention is characterized in that the epoxy resin (E) is formulated in an amount of 10 to 50000 parts by mass based on 100 parts by mass of the micro capsule type hardener (D) for an epoxy resin. When the epoxy resin (E) is formulated more than 50000 parts by mass, hardening property is lowered, while it is smaller than 10, viscosity of an epoxy resin composition increases, which lowers workability. From such a view point, the formulation amount of the epoxy resin (E) is preferably 100 to 5000, more preferably 130 to 400, and particularly preferably 150 to 300 based on 100 parts by mass of the micro capsule type hardener (D) for an epoxy resin.

In addition, an epoxy resin composition of the present invention is characterized by containing the highly soluble epoxy resin (G) having a solubility parameter of 8.900 to 12.00 in an amount of not less than 0.1% by weight, based on the epoxy resin (E). The case when the content is less than 0.1% by weight could not sufficiently exert the effect of the present invention (in particular, hardening property at low temperature and storage stability). In addition, the upper limit value is not especially limited, however, higher content of the highly soluble epoxy resin tends to increase water absorption rate. From such a view point, the content of the highly soluble epoxy resin (G) is preferably 1% to 99%, more preferably 5% to 50%, further preferably 10% to 40%, and particularly preferably 20% to 30%.

Total chlorine amount of the epoxy resin (E) is desirably not higher than 2000 ppm, more preferably not higher than 1000 ppm, more preferably not higher than 500 ppm, more preferably not higher than 300 ppm, more preferably not higher than 200 ppm, more preferably not higher than 100 ppm, more preferably not higher than 80 ppm, and further preferably not higher than 50 ppm to satisfy both high hardening property and storage stability.

In addition, to make control of a shell formation reaction easy, the total chlorine amount is preferably not lower than 0.01 ppm, more preferably not lower than 0.02 ppm, more preferably not lower than 0.05 ppm, more preferably not lower than 0.1 ppm, more preferably not lower than 0.2 ppm, and further preferably not lower than 0.5 ppm. For example, preferable range of the total chlorine amount is not lower than 0.1 ppm and not higher than 200 ppm, more preferable range is not lower than 0.2 ppm and not higher than 80 ppm, and more preferable range is not lower than 0.5 ppm and not higher than 50 ppm. The total chlorine amount in the present invention means total amount of organic chlorine and inorganic chlorine contained in a compound and is mass based value based on a compound.

An epoxy resin composition as the master batch type hardener (F) for an epoxy resin of the present invention is characterized in that the total chlorine amount is not higher than 2000 ppm. The lower total chlorine amount provides higher reactivity and it is desirable from a viewpoint of higher reliability when said epoxy resin composition is used as electronics material. The total chlorine amount is more preferably not higher than 1500 ppm, more preferably not higher than 1000 ppm, more preferably not higher than 500 ppm, more preferably not higher than 400 ppm, more preferably not higher than 300 ppm, more preferably not higher than 200 ppm, more preferably not higher than 100 ppm, and further preferably not higher than 50 ppm.

The total chlorine amount of an epoxy resin composition of the present invention is specified by a method described in the item of Example.

The epoxy resin (E) of the present invention is characterized by containing the highly soluble epoxy resin (G) described in the present specification in an amount of not lower than 0.1%, and kind of the epoxy resin (E) is not especially limited within a range not to impair the effect of the present invention. Such an epoxy resin (E) may include, for example, bisphenol type epoxy resins produced by glycidylation of bisphenols such as such as bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A, tetrafluorobisphenol A, etc.; epoxy resins produced by glycidylation of other dihydric phenols such as biphenol, 9,9-bis(4-hydroxyphenyl)fluorene, etc.; epoxy resins produced by glycidylation of trihydric phenols such as 1,1,1-tris(4-hydroxyphenyl)methane, 4,4-(1-(4-(1-(4-hydroxyphenyl)-1-methylethyl)phenyl)ethylidene)-bisphenol, etc.; epoxy resins produced by glycidylation of tetrakisphenols such as 1,1,2,2,-tetrakis(4-hydroxyphenyl)ethane; epoxy resins produced by glycidylation of polyhydric phenols, for example, novolac type epoxy resins produced by glycidylation of novolacs such as phenol novolac, cresol novolac, bisphenol A novolac, brominated phenol novolac, brominated bisphenol A novolac, etc.; aliphatic ether type epoxy resins produced by glycidylation of polyhydric alcohol such as glycerin or polyethylene glycol, etc.; ether-ester type epoxy resins produced by glycidylation of hydroxy carboxylic acid such as p-oxybenzoic acid, β-oxynaphthoic acid, etc.; ester-type epoxy resins produced by glycidylation of polycarboxylic acid such as phthalic acid, terephthalic acid, etc.; glycidylated epoxy resins, for example, glycidylated compound of amine compound such as 4,4-diaminodiphenyl methane and m-aminophenol, or amine type epoxy resins such as triglycidyl isocyanurate, etc.; and alicyclic epoxides such as 3,4-epoxycyclohexylmethyl 3',4'-epoxycyclohexane carboxylate, etc. However, a highly soluble epoxy resin is excluded.

These epoxy resins may be used alone or in combination.

As a method for producing an epoxy resin composition of the present invention, the following methods are included: a method for dispersing the hardener (C) for an epoxy resin and/or the micro capsule type hardener (D) for an epoxy resin produced in advance, into the epoxy resin (E) using, for example, a three roll mill; a method for carrying out a coating reaction of the hardener (C) for an epoxy resin and/or the micro capsule type hardener (D) for an epoxy resin in the epoxy resin (E) to simultaneously yield a hardener and the master batch type hardener (F) for an epoxy resin. The latter method is preferable due to providing high productivity.

An epoxy resin composition of the present invention is preferably liquid-like at room temperature or paste-like, having a viscosity at 25° C. of not higher than 10 million mPa·s, more preferably not higher than 500000 mPa·s, further preferably 1000 to 300000 mPa·s, and far preferably 3000 to 200000 mPa·s.

Lower viscosity provides higher workability, decreased adhered amount to a container, which is capable of reducing waste products, and thus preferable.

The master batch type hardener (F) for an epoxy resin of the present invention is composed of the hardener (C) for an epoxy resin and/or the micro capsule type hardener (D) for an epoxy resin, and the epoxy resin (E) and the highly soluble epoxy resin (G), however, other components may be contained in a range not to impair function thereof. The content of other components is preferably below 30% by mass.

A one component epoxy resin composition is obtained by mixing the hardener (C) for an epoxy resin and/or the micro capsule type hardener (D) for an epoxy resin and/or the master batch type hardener (F) for an epoxy resin of the present invention, into the epoxy resin (J)

The epoxy resin (J) used in an epoxy resin composition of the present invention may be any one as long as having 2 or more epoxy groups in average in 1 molecule and may be the same one as the epoxy resin (E), and is exemplified, for example, by bisphenol type epoxy resins produced by glycidylation of bisphenols such as bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A, tetrafluorobisphenol A, etc.; epoxy resins produced by glycidylation of other dihydric phenols such as biphenol, 9,9-bis (4-hydroxyphenyl)fluorene, etc.; epoxy resins produced by glycidylation of trihydric phenols such as 1,1,1-tris(4-hydroxyphenyl)methane, 4,4-(1-(4-(1-(4-hydroxyphenyl)-1-methylethyl)phenyl)ethylidene)-bisphenol, etc.; epoxy resins produced by glycidylation of tetrakisphenols such as 1,1, 2,2,-tetrakis(4-hydroxyphenyl)ethane, etc.; epoxy resins produced by glycidylation of polyhydric phenols exemplified as novolac type epoxy resin produced by glycidylation of novolacs such as phenol novolac, cresol novolac, bisphenol A novolac, brominated phenol novolac, brominated bisphenol A novolac, etc.; aliphatic ether type epoxy resins produced by glycidylation of polyhydric alcohol such as glycerin or polyethylene glycol, etc.; ether-ester type epoxy resins produced by glycidylation of hydroxy carboxylic acid such as p-oxybenzoic acid, β-oxynaphthoic acid, etc.; ester-type epoxy resins produced by glycidylation of polycarboxylic acid such as phthalic acid, terephthalic acid, etc.; amine type epoxy resins, for example, glycidylated compounds of amine compounds such as 4,4-diaminodiphenyl methane m-aminophenol, or triglycidyl isocyanurate, etc.; and alicyclic epoxides such as 3,4-epoxycyclohexylmethyl 3',4'-epoxycyclohexane carboxylate, etc.

The mixing ratio of an epoxy resin composition of the present invention and the epoxy resin (J) is determined in view of hardening property and characteristics of a hardened substance, however, preferably an epoxy resin composition of the present invention may be used in an amount of 0.1 to 100 parts by mass, more preferably 0.2 to 80 parts by mass and further preferably 0.5 to 60 parts by mass based on 100 parts by mass of the epoxy resin (J). The amount not less than 0.1 part by mass is capable of providing practically satisfactory hardening performance, while the amount not higher than 100 parts by mass provides a hardener having hardening performance in good balance, without localization of an epoxy resin composition of the present invention.

In addition, into the hardener (C) for an epoxy resin and/or the micro capsule type hardener (D) for an epoxy resin and/or the master batch type hardener (F) for an epoxy resin used in the present invention, a high molecular weight type epoxy resin having self-film formation property, which is generally referred to as a phenoxy resin, may also be mixed.

Into the hardener (C) for an epoxy resin and/or the micro capsule type hardener (D) for an epoxy resin and/or the master batch type hardener (F) for an epoxy resin used in the present invention, at least one kind of the hardener (K) selected from the group consisting of acid anhydrides, phenols, hydrazides and guanidines can be used in combination.

Acid anhydrides are exemplified by, for example, phthalic anhydride, trimellitic anhydride, pyromellitic dianhydride, hexahydrophthalic anhydride, tetrahydrophthalic anhydride, 3-chloro-phthalic anhydride, 4-chloro-phthalic anhydride, benzophenone tetracarboxylic acid dianhydride, succinic anhydride, methylsuccinic anhydride, dichlorosuccinic anhydride, methylnadic anhydride, dodecylsuccinic anhydride, chlorendic anhydride, maleic anhydride, etc. Phenols include, for example, phenol novolac, cresol novolac, bisphenol A novolac, etc. Hydrazides include, for example, succinic acid dihyrazide, adipic acid dihydrazide, phthalic acid dihydrazide, isophthalic acid dihydrazide, terephthalic acid dihydrazide, p-oxybenzoic acid hydrazide, salicylic acid hydrazide, phenylaminopropionic acid hydrazide, maleic acid dihydrazide, etc. Guanidines include, for example, dicyandiamide, methylguanidine, ethylguanidine, propylguanidine, butylguanidine, dimethylguanidine, trimethylguanidine, phenylguanidine, diphenylguanidine, toluoylguanidine, etc.

Preferable ones among the hardeners (K) are guanidines and acid anhydrides, and further preferable ones are dicyanediamide, hexahydrophthalic anhydride, methyltetrahydrophthalic anhydride, and methylnadic anhydride. When the hardener (K) is used, the hardener (K) is preferably used in an amount of 1 to 200 parts by mass, based on 100 parts by mass of the epoxy resin (E). Use within this range provides a composition excellent in hardening property and storage stability, and a hardened substance with excellent heat resistance and water resistance.

An epoxy resin composition of the present invention can contain the micro capsule type hardener (D) for an epoxy resin, the epoxy resin (E) and the cyclic borate ester compound (L).

Containing these is capable of improving storage stability of an epoxy resin composition, in particular, storage stability at high temperature.

The above cyclic borate ester compound (L) is a compound where boron is contained in the cyclic structure, and in particular, 2,2'-oxybis(5,5'-dimethyl-1,3,2-dioxaborinane) is preferable.

The content of the above cyclic borate ester compound (L) is 0.001 to 10 parts by mass, preferably 0.01 to 2 parts by mass and further preferably 0.05 to 0.9 parts by mass based on 100 parts by mass of the epoxy resin (E). Use within this range provides hardening showing excellent storage stability at high temperature of a composition, along with an excellent hardened substance without impairing original short period hardening property, heat resistance, adhesiveness and connection reliability.

The hardener (C) for an epoxy resin and/or the microcapsule type hardener (D) for an epoxy resin, and/or, and the master batch type hardener (F) for an epoxy resin, used in this invention, can optionally be added with extenders, reinforcing material, fillers, conductive fine particles, pigments, organic solvents, reactive diluents, non-reactive diluents, resins, coupling agents, etc. Examples of fillers may include, for example, coal tar, glass fiber, asbestos fiber, boron fiber, carbon fiber, cellulose, polyethylene powder, polypropylene powder, quartz powder, mineral silicate, mica, asbestos powder, slate powder, kaolin, aluminium oxide trihydrate, aluminium hydroxide, chalk powder, plaster, calcium carbonate, antimony trioxide, penton, silica, aerosol, lithopone, barites, titanium dioxide, carbon black, graphite, iron oxide, gold, aluminium powder, iron powder, etc., and any of them can effectively be utilized depending on applications thereof. Organic solvents include, for example, toluene, xylene, methyl ethyl ketone, methyl isobutyl ketone, ethyl acetate, butyl acetate, etc. Reactive diluent may include, for example, butyl glycidyl ether, N,N-diglycidyl-o-toluidine, phenyl glycidyl ether, styrene oxide, ethylene glycol diglycidyl ether, propylene glycol diglycidyl ether, 1,6-hexanediol diglycidyl ether, etc. Non-reactive diluents include, for example, dioctyl phthalate, dibutyl phthalate, dioctyl adipate, petroleum solvent, etc. Resins include, for example, a polyester resin, a polyurethane resin, an acrylic resin, a polyether resin, a melamine resin or a modified epoxy resin such as a urethane modified epoxy resin, a rubber modified epoxy resin, and an alkyd modified epoxy resin, etc.

An epoxy resin composition used in the present invention is composed of, as major components, the hardener (C) for an epoxy resin and/or the micro capsule type hardener (D) for an epoxy resin and the epoxy resin (E) and the highly soluble epoxy resin (G), and if necessary, the epoxy resin (J) and the hardener (K). An epoxy resin composition of the present invention exerts desired performance by thermal hardening, and "major components" here means major components of the thermal hardening reaction, and preferably occupy not less than 60%, and further preferably not less than 70% of the thermally hardenable components.

As compositions not participating in hardening of a one component epoxy resin composition, for example, extenders, reinforcing material, fillers, conductive particles, pigments, organic solvents, resins, and the like are included, and these components are preferably be used in a range of 0 to 90% by mass, based on total amount of the one component epoxy resin composition.

An epoxy resin composition of the present invention is useful as adhesives, sealant, filler material, insulating material, conductive material, anisotropic conductive material, sealing material, structural adhesives, prepreg, and the like, and as adhesives, it is useful as liquid adhesives or film-like adhesives and die bonding material; as sealant, it is useful as solid sealant or liquid sealant and film-like sealant; as liquid sealant, it is useful as under-fill material, potting material, dam material, and the like; as insulating material, it is useful as insulating adhesive films, insulating paste, solder resist, and the like; as conductive material, it is useful as conductive films, conductive paste, and the like; and as anisotropic conductive material, it is useful as anisotropic conductive films, anisotropic conductive paste, and the like. In the applications as conductive material or anisotropic conductive material, a one component epoxy resin composition of the present invention is used by being dispersed with conductive particles. As conductive particles, solder particles, nickel particles, metal particles whose surface is coated with other metal, metal particles with gradient structured particles of gold and silver, particles of plastics such as a styrene resin, a urethane resin, a melamine resin, an epoxy resin, an acrylic resin, a phenolic resin, a styrene-butadiene resin, etc., coated with a conductive thin film of such as gold, nickel, silver, copper, solder, and the like are used. In general, conductive particles are spherical fine particles with a diameter of about 1 to 20 μm. As a method for making a film, such a method is adopted that a solvent is formulated in a one component epoxy resin composition, which is then applied onto a substrate of, for example, polyester, polyethylene, polyimide, polytetrafluoroethylene, etc., followed by drying the solvent, and the like.

In the case of using as insulating material or sealant, silica, and the like is added as fillers into an epoxy resin composition of the present invention. As a method for making a film, such a method is adopted that a solvent is formulated in an epoxy resin composition, which is applied onto a substrate such as polyester, followed by drying the solvent, and the like.

EXAMPLES

The present invention is explained in more detail based on Examples, however, the technical scope and embodiments of the present invention should not be limited thereto. "Parts" or "%" in Examples and Comparative Examples is based on mass unless otherwise specified.

Property evaluation tests of resins and hardened substances thereof relevant to the present Examples and Comparative Examples were carried out by the methods described below:

(1) Epoxy Equivalent

Epoxy equivalent is defined as mass (g) of an epoxy resin which contains 1 equivalent of an epoxy group, and was determined in accordance with JIS K-7236.

(2) Total Chlorine Amount

A sample of 1 g was dissolved in 25 ml of ethylene glycol monobutyl ether, to which 25 ml of a propylene glycol solution of 1N KOH was added and boiled for 20 minutes, and then titrated with an aqueous solution of silver nitrate.

(3) Total Chlorine Amount of the Epoxy Resin (E)

An epoxy resin composition was repeatedly washed with xylene and filtered until the epoxy resin completely disappeared. Then the filtrate was subjected to vacuum removal at 100° C. or lower to yield an epoxy resin. The resultant epoxy resin sample of 1 to 10 g was accurately weighed so that titration amount was 3 to 7 ml, and then dissolved in 25 ml of ethylene glycol monobutyl ether, to which 25 ml of a propylene glycol solution of 1N KOH was added and boiled for 20 minutes, to titrate with an aqueous solution of silver nitrate.

(4) Hydrolyzable Chlorine Amount

A sample of 3 g was dissolved in 50 ml of toluene, to which 20 ml of a methanol solution of 0.1N KOH was added and boiled for 15 minutes, and then titrated with an aqueous solution of silver nitrate.

(5) Viscosity

Viscosity was measured at 25° C. using a BM type viscometer.

(6) Softening Point

Softening point was determined in accordance with JIS K-7234 (a ring and ball method).

(7) FT-IR Measurement

Absorbance was measured using FT/IR-410 produced from JASCO Corp.

(8) Molecular Weight Distribution

Gel permeation chromatography was carried out using HLC8220GPC (detector: RI) produced from Tosoh Corp., under conditions of column: 2 pieces of PLgel 3μ MIXED-E (produced from Polymer Laboratory Co., Ltd.); eluent: a dimethylformamide solution of 1% lithium bromide; calibration curve: polystyrene. Molecular weight distribution was shown as value obtained by weight average molecular weight divided by number average molecular weight.

(9) Gel Time Measurement

Gel time was determined using a V-type Curastmeter produced from T.S. Engineering Co., Ltd. in accordance with JIS K-6300.

(10) Separation of the Microcapsule Type Hardener (D) for an Epoxy Resin from the Master Batch Type Hardener (F) for an Epoxy Resin An epoxy resin composition was repeatedly washed with xylene and filtered until the epoxy resin completely disappeared. Then it was repeatedly washed with cyclohexane and filtered until xylene completely disappeared. Then cyclohexane was filtered and completely removed by drying at a temperature of 50° C. or lower.

(11) Separation of a Capsule Film from the Microcapsule Type Hardener (D) for an Epoxy Resin The capsule type hardener was repeatedly washed with methanol and filtered until an amine hardener completely disappeared. Then methanol was completely removed by drying at a temperature of 50° C. or lower.

(12) Fundamental Structure of the Highly Soluble Epoxy Resin

An epoxy resin composition was repeatedly washed with xylene and filtered until the epoxy resin completely disappeared. Then the filtrate was subjected to vacuum removal at 100° C. or lower to yield an epoxy resin.

Then resultant epoxy resin was analyzed by high-performance liquid chromatography, and the separated solution was subjected to vacuum removal by each fraction, and the residue was analyzed by MS, NMR and IR. Structure containing epoxy groups at both terminals was regarded as fundamental structure.

(13) Impurity Components at Diol Terminals of the Highly Soluble Epoxy Resin, and Structure Thereof In the same way as fundamental structure of the highly soluble epoxy resin, impurity components at the diol terminals on an LC chart were identified, and based on area ratio thereof, area ratio of impurity components at the diol terminals of the highly soluble epoxy resin to fundamental structure component of the highly soluble epoxy resin was determined. In this connection, a detection wavelength of 254 nm was used.

(14) Melt Viscosity

Melt viscosity was measured using an RE-550H type viscometer (rotor R-H HH4) produced from Toki Sangyo Co., Ltd. under conditions of a rotating speed of 20 rpm and a measurement temperature at 160° C.

(15) Hardening Property of a One Component Epoxy Resin Composition-1

The master batch type hardener for an epoxy resin of 30 parts, produced in Examples or Comparative Examples, was mixed with 100 parts of the epoxy resin E-1 to produce a one component epoxy resin composition, and gel time thereof was measured at 100° C. to be used as an index of hardening property of the one component epoxy resin composition.

(16) Storage Stability of a one Component Epoxy Resin Composition-1

The master batch type hardener for an epoxy resin of 30 parts, produced in Examples or Comparative Examples, was mixed with 100 parts of a bisphenol A type epoxy resin (epoxy equivalent 189 g/equivalent, total chlorine amount 1200 ppm: hereinafter referred to as the epoxy resin E-1) to produce a one component epoxy resin composition, which was stored at 40° C. for a week to evaluate storage stability by a value obtained by viscosity after storage divided by viscosity before storage (hereinafter referred to as viscosity time). Evaluation criteria based on viscosity time are as follows: ⊚ below 1.5 times, ○ below 2 times, Δ 2 times or more and below 3 times, × 3 times or more, ×× one gelled during storage

(17) Storage Stability of an Epoxy Resin Composition-2

An epoxy resin composition was mixed with a mixed solvent of ethyl acetate/toluene=1/1, so that nonvolatile matter became 70%, which was stood still at 25° C. for 1 hour. This solution was applied so that dried film thickness became 30 μm, and dried by heating at 70° C. for 5 minutes to remove the solvent in the composition, and stored at 50° C. for 3 days. FT-IR measurements were carried out before and after the storage at 50° C. for 3 days to evaluate storage stability by calculation of residual ratio of epoxy groups based on peak height of 914 $cm^{-1}$.

(18) Hardening Property of an Epoxy Resin Composition-2

Gel time of an epoxy resin composition was determined to evaluate hardening property by measuring temperature giving a gel time of below 5 minutes.

(19) Reaction Rate of the Epoxy Group of an Epoxy Resin

An epoxy resin composition was mixed with a mixed solvent of ethyl acetate/toluene=1/1, so that nonvolatile matter became 70%, which was stood still at 25° C. for 1 hour. This solution was applied so that dried film thickness became 30 μm, and dried by heating at 70° C. for 5 minutes to remove the solvent in the composition, and subjected to thermocompression on a hot plate at 200° C. for 20 seconds under 30 kg/$cm^2$. FT-IR measurements were carried out before and after compression to evaluate reaction rate of the epoxy group by calculation of loss ratio of the epoxy groups based on peak height of 914 $cm^{-1}$.

Production Example 1-1

(Production of the Amine Adduct (A-1))

One equivalent of a bisphenol A type epoxy resin (epoxy equivalent 175 g/equivalent, total chlorine amount 1600 ppm:

hereinafter referred to as the epoxy resin al-1) and 1 equivalent of 2-methylimidazole (converted value to an active hydrogen) were reacted in a mixed solvent of n-butanol/toluene=1/1 (resin content 50%) at 80° C. for 6 hours. Then, the reaction solution was subjected to distillation at 200° C. under reduced pressure to remove unreacted 2-methylimidazole, along with the solvent, until the content thereof became below 10 ppm, to yield the amine adduct A-1. The resultant amine adduct had a molecular weight distribution of 1.4.

Production Example 1-2

(Production of the Amine Adduct (A-2))

An amine adduct was produced in the same way as in Production Example 1-1, except that charged amount of 2-methylimidazole was 2 equivalents to yield the amine adduct A-2. The resultant amine adduct had a molecular weight distribution of 1.1.

Production Example 1-3

(Production of the Amine Adduct (A-3))

An amine adduct was produced in the same way as in Production Example 1-1, except that charged amount of 2-methylimidazole was 0.85 equivalent to yield the amine adduct A-3. The resultant amine adduct had a molecular weight distribution of 2.1.

Production Example 1-4

(Production of the Amine Adduct (A-5))

An amine adduct was produced in the same way as in Production Example 1-1, except that charged amount of 2-methylimidazole was 0.7 equivalent to yield the amine adduct A-5. The resultant amine adduct had a molecular weight distribution of 3.7.

Production Example 2-1

(Production of the Epoxy Resin G-1)

Into a 2 L three-neck flask equipped with a stirring apparatus and a thermometer, 166 g (1 mol) of tert-butylhydroquinone, 1850 g (20 mol) of epichlorohydrin, 296 g (4 mol) of glycidol, and 0.55 g of tetramethyl ammonium chloride were charged and subjected to an addition reaction under refluxing by heating for 2 hours. Then, the content was cooled to 60° C., and after mounting water removal apparatus, 183 g of 48.5% sodium hydroxide (2.2 moles) was added, and generated water was continuously removed as an azeotrope under a reduced pressure of 100 to 150 mmHg, and subjected to a ring closure reaction by returning an epichlorohydrin layer among distillates to a reaction system. The time when the amount of the generated water reached 56.5 ml was set to be the reaction end point.

Subsequently, filtration under reduced pressure and washing with water were repeated, and residual epichlorohydrin was recovered by further distillation under reduced pressure to yield a crude epoxy resin.

The resultant crude epoxy resin was subjected to repeated distillation under reduced pressure to yield the epoxy resin G-1 (epoxy equivalent 155, hydrolysable chlorine amount 25 ppm, total chlorine amount 670 ppm, viscosity at 25° C. 750 centipoises, impurity components at diol terminals/fundamental structure component=0.13, molecular weight between crosslinked points 139, and solubility parameter 8.93).

Production Example 2-2

(Production of an Epoxy Resin G-2)

By carrying out similar operation as in Production Example 2-1, except that 110 g (1 mol) of resorcin was used instead of 166 g of tert-butylhydroquinone (1 mole), the epoxy resin G-2 (epoxy equivalent 115, hydrolysable chlorine amount 18 ppm, total chlorine amount 600 ppm, viscosity at 25° C. 110 centipoises, impurity components at diol terminals/fundamental structure component=0.12, molecular weight between crosslinked points 111, and solubility parameter 9.13) was obtained.

Production Example 2-3

(Production of an Epoxy Resin G-3)

By carrying out similar operation as in Production Example 2-1, except that glycidol was not added in the reaction, the epoxy resin G-3 (epoxy equivalent 113, hydrolysable chlorine amount 30 ppm, total chlorine amount 600 ppm, viscosity at 25° C. 100 centipoises, impurity components at diol terminals/fundamental structure component=0.03, molecular weight between crosslinked points 111, and solubility parameter 9.13) was obtained.

Production Example 3

(The Epoxy Resin X)

By carrying out similar operation as in Production Example 2-1, except that 158 g of 48.5% sodium hydroxide (1.9 moles) was used, the epoxy resin X (epoxy equivalent 122, hydrolysable chlorine amount 1000 ppm, total chlorine amount 10000 ppm, viscosity at 25° C. 120 centipoise, impurity components at diol terminals/fundamental structure component=0.10, molecular weight between crosslinked points 111, and solubility parameter 9.13) was obtained.

Properties of synthesized epoxy resins G-1 to G-3 and X are shown in Table 2.

[Table 2]

TABLE 2

| Property of the highly soluble epoxy resins (G-1 to G-3 and X) | | | | |
|---|---|---|---|---|
| | Epoxy resin | | | |
| | G-1 | G-2 | G-3 | X |
| Epoxy equivalent | 155 | 115 | 113 | 122 |
| Impurity components at diol terminals | 0.13 | 0.12 | 0.03 | 0.10 |
| Total Cl amount (ppm) | 670 | 600 | 600 | 10000 |
| Hydrolysable Cl amount (ppm) | 25 | 18 | 30 | 1000 |
| Solubility parameter | 8.93 | 9.13 | 9.13 | 9.13 |
| MW between crosslinked points | 139 | 111 | 111 | 111 |
| Viscosity (cps) | 750 | 110 | 100 | 150 |

Example 1

The amine adduct A-1 of 100 parts by mass, obtained in Production Example 1-1 was melted, to which 0.8 part by mass of 2-ethyl-4-methylimidazole was homogeneously mixed, and crushed after cooling to room temperature to yield the hardener C-1 for an epoxy resin, having a softening point of 97° C. and an average particle diameter of 2.5 μm. To 200 parts by mass of the epoxy resin E-1, 100 parts by mass of the amine hardener A-1, 1.5 parts by mass of water and 5 parts by mass of tolylene diisocyanate were added to continue a reaction for 3 hours under stirring at 40° C. Then, the reaction mixture was subjected to a shell formation reaction at 50° C. for 8 hours to yield the master batch type hardener F-1 for an epoxy resin.

The microcapsule type hardener for an epoxy resin was separated from the master batch type hardener F-1, using xylene, and presence of the bonding groups (x), (y) and (z) was confirmed by FT-IR measurement.

Furthermore, hardening property-1 and storage stability-1 of a one component epoxy resin composition, obtained by formulating 30 parts of the resultant master batch type hardener F-1 for an epoxy resin to 100 parts of the epoxy resin E-1, were evaluated. The results are shown in Table 3.

Examples 2 and 3

The hardeners C-2 and C-3 for an epoxy resin were obtained in the same way as in Example 1, using the formulation shown in Table 3. Characteristics of the resultant hardeners for an epoxy resin are shown in Table 3.

Furthermore, the master batch type hardeners F-2 and F-3 for an epoxy resin were obtained in the same way as in Example 1, using the formulation shown in Table 3. Presence of the bonding groups (x), (y) and (z) was confirmed in any of F-2 and F-3, in the same way as in Example 1, and hardening property-1 and storage stability-1 of a one component epoxy resin composition, obtained by using the master batch type hardeners F-2 and F-3 as a hardener, were evaluated, in the same way as in Example 1. The evaluation results are shown in Table 3.

Example 4

One equivalent of a bisphenol F type epoxy resin (epoxy equivalent 165 g/equivalent, total chlorine amount 300 ppm: hereinafter referred to as the epoxy resin a1-2) and 1 equivalent of 2-methylimidazole (converted value to an active hydrogen) were reacted in a mixed solvent (resin content 50%) of n-butanol/toluene=1/1 at 80° C. for 6 hours. Then, the reaction solution was subjected to distillation under reduced pressure at 200° C. to remove unreacted 2-methylimidazole, along with the solvent, until the content of 2-methylimidazole became 0.05% by mass (based on resin content), to yield an amine hardener comprising an amine adduct having a molecular weight distribution of 1.4 (referred to as the amine adduct A-4) and 0.05% by mass of 2-methylimidazole as the low molecular weight amine compound (B). The resultant amine hardener was crushed at room temperature to yield the hardener C-4 for an epoxy resin, having a softening point of 101° C. and an average particle diameter of 2.4 µm.

Furthermore, the master batch type hardener F-4 was obtained in the same way as in Example 1, using the formulation shown in Table 3. Presence of the bonding groups (x), (y) and (z) was confirmed, in the same way as in Example 1, and hardening property-1 and storage stability-1 of a one component epoxy resin composition, obtained in the same way as in Example 1 using the master batch type hardener F-4, as a hardener, were evaluated. The evaluation results are shown in Table 3.

Comparative Example 1

The hardener C-5 for an epoxy resin was obtained in the same way as in Example 1, using the formulation shown in Table 3. Characteristics of the resultant hardener for an epoxy resin are shown in Table 1.

Furthermore, the master batch type hardener K-5 was obtained in the same way as in Example 1, using the formulation shown in Table 3. Hardening property-1 and storage stability-1 of a one component epoxy resin composition, obtained in the same way as in Example 1 using the master batch type hardener K-5 as a hardener, were evaluated. The evaluation results are shown in Table 3.

As shown in Table 3, in the present Comparative Example, wherein molecular weight distribution of the amine adduct (A-5) is over 3, diffusibility of the amine adduct (A-5) into the epoxy resin (E) is low under low temperature hardening condition, resulting in low hardening property.

Comparative Example 2

One equivalent of the epoxy resin E-1 and 0.85 equivalent of 2-methylimidazole (converted value to an active hydrogen) were reacted in a mixed solvent (resin content 50%) of n-butanol/toluene=1/1 at 80° C. for 6 hours. The amount of the unreacted 2-methylimidazole at this time was 2.0% by mass (based on resin content). Subsequently, the solvent was removed by distillation at 180° C. under reduced pressure to yield an amine hardener comprising an amine adduct having a molecular weight distribution of 2.1 (referred to as the amine adduct A-6) and 2.0% by mass of 2-methylimidazole as the low molecular weight amine compound (B).

The resultant amine hardener was crushed at room temperature to yield the hardener C-6 for an epoxy resin, having a softening point of 94° C. and an average particle diameter of 2.5 µm.

Furthermore, the master batch type hardener F-6 was obtained in the same way as in Example 1, using the formulation shown in Table 3. Hardening property-1 and storage stability-1 of a one component epoxy resin composition, obtained in the same way as in Example 1 using the master batch type hardener F-6, as a hardener, were evaluated. The evaluation results are shown in Table 3.

As shown in Table 3, in the present Comparative Example, wherein content of the low molecular weight amine compound (B) is over 1 part by mass, the low molecular weight amine compound (B) reacted with the epoxy resin (E) during storage, resulting in low storage stability.

Comparative Example 3

An amine hardener was obtained in the same way as in Example 1, using the formulation (only the amine adduct A-1) shown in Table 3. Characteristics of the resultant amine hardener are shown in Table 3.

Furthermore, the master batch type hardener F-7 was obtained in the same way as in Example 1, using the formulation shown in Table 3, and hardening property-1 and storage stability-1 of a one component epoxy resin composition, obtained in the same way as in Example 1 using the master batch type hardener F-7 as a hardener, were evaluated. The evaluation results are shown in Table 3.

As shown in Table 3, in the present Comparative Example, wherein content of the low molecular weight amine compound (B) is below 0.001 part by mass, a fine shell could not be formed during production of the master batch type hardener, resulting in low storage stability.

Comparative Example 4

One equivalent of the epoxy resin E-1 and 2 equivalents of 2-methylimidazole (converted value to an active hydrogen) were reacted in a mixed solvent (resin content 50%) of n-butanol/toluene=1/1 at 80° C. for 6 hours. Subsequently, the solvent was removed at 180° C. under reduced pressure to yield an amine hardener comprising an amine adduct having a molecular weight distribution of 1.1 (referred to as the amine adduct A-7) and 20% by mass of 2-methylimidazole as the low molecular weight amine compound (B).

The resultant amine hardener was crushed under cooling to yield the hardener C-7 for an epoxy resin, having a softening point of 60° C. and an average particle diameter of 7.1 μm.

Furthermore, production of a master batch type hardener was tried in the same way as in Example 1, using the formulation shown in Table 3, however, the master batch type hardener could not be obtained due to gelation in the midst of the reaction.

[Table 3]

one component epoxy resin composition. The resultant composition was usable after-storing at 40° C. as long as 1 week, and was hardened at 140° C.

Example 6

To 100 parts by mass of the epoxy resin E-1, 80 parts by mass of methylhexahydrophthalic anhydride, 300 parts by mass of spherical molten silica powder (average particle diameter 10 μm) were added and homogeneously mixed, and to which 6 parts by mass of the master batch type hardener F-4, obtained in Example 4, was homogeneously mixed to yield liquid sealant.

The resultant liquid sealant was sandwiched between a substrate and an LSI, and heated at 100° C. for 3 hours, and

TABLE 3

Table of Examples and Comparative Examples

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Amine hardener | Amine adduct (A) | A-1 | A-2 | A-3 | A-4 | A-5 | A-6 | A-1 | A-7 |
| | M.W. distribution | 1.4 | 1.1 | 2.1 | 1.4 | 3.7 | 1.1 | 1.4 | 1.1 |
| | Low molecular weight amine compound (B) | 2E4MZ | TEDA | 2MZ | 2MZ | TEDA | 2MZ | — | 2MZ |
| | (parts) | 0.8 | 0.2 | 0.3 | 0.05 | 0.2 | 2 | | 20 |
| | Softening point (° C.) | 97 | 102 | 103 | 101 | 103 | 94 | 103 | 60 |
| | Average particle diameter (μm) | 2.5 | 2.9 | 1.9 | 2.4 | 2.0 | 2.5 | 1.9 | 7.1 |
| Master batch type hardener | Amine hardener (parts) | 100 | 100 | 100 | 100 | 100 | 100 | 100 | 100 |
| | Epoxy resin (E) (parts) | E-1 | E-2 | E-1 | E-2 | E-2 | E-2 | E-1 | E-2 |
| | | 200 | 200 | 200 | 200 | 200 | 200 | 200 | 200 |
| | Isocyanate compound (H) (parts) | TDI | OTI | MR-200 | MR-200 | MR-200 | MR-200 | TDI | TDI |
| | | 5 | 8 | 11 | 9 | 9 | 9 | 5 | 7 |
| | Water (Active hydrogen compound (I)) (parts) | 1.5 | 2 | 2.2 | 2 | 2 | 2 | 1.5 | 2 |
| One component epoxy resin compound Storage stability-1 | | ○ | Δ | ○ | ○ | Δ | XX | XX | Gelation while producing the master batch hardener |
| Hardening property (minutes) | | 12 | 3 | 45 | 11 | No gelation | 13 | 15 | — |

Epoxy resin E-1: bisphenol A type liquid epoxy resin (epoxy equivalent 175 g/equivalent, total chlorine amount: 1600 ppm)
Epoxy resin E-2: bisphenol F type liquid epoxy resin (epoxy equivalent 165 g/equivalent, total chlorine amount: 300 ppm)
Epoxy resin E-3: bisphenol A type liquid epoxy resin (epoxy equivalent 189 g/equivalent, total chlorine amount: 1200 ppm)
2MZ: 2-methylimidazole
TEDA: triethylene diamine
2E4MZ: 2-ethyl-4-methylimidazole
TDI: tolylene diisocyanate
OTI: 1,8-diisocyanato-4-isocyanatomethyloctane
MDI: 4,4'-diphenylmethane diisocyanate
MR-200: polymethylenephenylene polyisocyanate produced from NIPPON POLYURETHANE INDUSTRY CO, LTD.

Example 5

To 8 parts by mass of dicyanediamide crushed in advance so as to have an average particle diameter of 3 μm, 3 parts by mass of the master batch type hardener F-3, obtained in Example 3, 95 parts by mass of the epoxy resin E-3, 5 parts by mass of EP-4023 (a CTBN modified epoxy resin produced from Adeka Co., Ltd.), and 20 parts by mass of calcium carbonate were added and homogeneously mixed to yield a then heated further at 150° C. for 3 hours to harden the liquid sealant, which was confirmed to be useful as sealant. The liquid sealant of the present composition was also useful as insulating adhesive paste.

Example 7

Into 40 parts by mass of ethyl acetate, 100 parts by mass of a bisphenol A type epoxy resin (epoxy equivalent 2500 g/equivalent) was dissolved, to which 50 parts by mass of the master batch type hardener F-3, obtained in Example 3, and 8 parts by mass of conductive particles with a particle diameter of 5 μm (crosslinked polystyrene plated with gold) were added and uniformly mixed to yield a one component epoxy resin composition. The resultant composition was applied onto a polyester film and then ethyl acetate was removed by drying at 60° C. to yield an anisotropic conductive film.

The resultant anisotropic conductive film was sandwiched between electrodes and subjected to thermocompression on a hot plate at 200° C. for 20 seconds under 30 kg/cm², resulting in junction between the electrodes and electrical continuity, which thus proved usefulness as anisotropic conductive material.

Examples 8 to 10 and Comparative Examples 5 to 6

Examples 8 to 10 as the present invention and Comparative Examples 5 to 6 as comparison are shown in Table 4. Number of each component in the charge column represents parts by mass based on 100 parts by mass of the amine hardener P.

hot plate at 200° C. for 20 seconds under 30 kg/cm². The results are shown in Tables 5 and 6.

Example 14

To 100 parts of a bisphenol F type epoxy resin (epoxy equivalent 165 g/equivalent, total chlorine amount 1200 ppm, hydrolysable chlorine amount 400 ppm), 80 parts of methylhexahydrophthalic anhydride, 300 parts by mass of spherical molten silica powder (average particle diameter 10 μm) were added and homogeneously mixed, to which 6 parts of any one of the epoxy resin compositions 1 to 3, shown in Table 4, was added and homogeneously mixed to yield liquid sealant.

The resultant liquid sealant was sandwiched between a substrate and an LSI, and heated at 100° C. for 3 hours, and then heated further at 150° C. for 3 hours to harden the liquid sealant, which was confirmed to be useful as sealant. The liquid sealant of the present composition was also useful as insulating adhesive paste.

[Table 4]

TABLE 4

Table of Examples and Comparative Examples

| | | Example 8 | Example 9 | Example 10 | Comparative Example 5 | Comparative Example 6 |
|---|---|---|---|---|---|---|
| Charge: | Amine hardener P | 100 | 100 | 100 | 100 | 100 |
| | Epoxy resin (E) | BF 150 | BF 150 | BF 150 | BF 150 | BF 150 |
| | Water | 1.5 | 1.5 | 1.5 | 1.5 | 1.5 |
| | MDI | 10 | 10 | 10 | 10 | 10 |
| | Epoxy resin 2 | F-1 50 | F-2 50 | F-3 50 | X 50 | BA 50 |
| Epoxy resin composition | | 1 | 2 | 3 | 4 | 5 |
| Total chlorine amount in epoxy resin composition (ppm) | | 700 | 680 | 680 | 2300 | 630 |
| Storage stability-2 (%) | | 70 | 65 | 60 | 65 | 60 |
| Hardening property-2 | | 90 | 85 | 98 | 110 | 120 |

BF: bisphenol F type liquid epoxy resin (SP: 9.040, molecular weight between crosslinked points 156, total chlorine amount: 300 ppm)
BA: bisphenol A type liquid epoxy resin (SP: 8.895, molecular weight between crosslinked points 170, total chlorine amount: 300 ppm)
Amine hardener P: 2-ethyl-4-methylimidazole-epoxy resin adduct, total chlorine amount: 1300 ppm)

The epoxy resin (E), the amine hardener P, water, and MDI (4,4'-diphenylmethane diisocyanate), described in Table 4, were charged into a cup of a non-bubbling kneader, and stirred at room temperature for 3 hours. Furthermore, the epoxy resin 2 was added to yield an epoxy resin composition.

Examples 11 to 13 and Comparative Examples 7 to 8

Into 30 parts of ethyl acetate, 40 parts of a bisphenol A type epoxy resin (epoxy equivalent 2500 g/equivalent) was dissolved, to which 60 parts of each of the epoxy resin compositions 1 to 5 shown in Table 5, and 10 parts of conductive particles with a particle diameter of 8 μm (crosslinked polystyrene plated with gold) were added and uniformly mixed to yield an epoxy resin composition. The resultant composition was applied onto a polyester film and then ethyl acetate was removed by drying at 70° C. to yield an anisotropic conductive film.

The resultant anisotropic conductive film was sandwiched between electrodes and subjected to thermocompression on a

[Table 5]

TABLE 5

Table of Examples and Comparative Examples

| | Example 11 | Example 12 | Example 13 | Comparative Example 7 | Comparative Example 8 |
|---|---|---|---|---|---|
| Epoxy resin composition | 1 | 2 | 3 | 4 | 5 |
| Electric characteristics (resistance) (Ω) | <1 | <1 | 1.9 | 5 | 7 |
| Peel strength (N/cm) | 14 | 15 | 10 | 6 | 4 |
| Reactivity of epoxy group (%) | 90 | 98 | 78 | 70 | 75 |
| Water resistance | ○ | ○ | ○ | X | X |

○: good,
X: no-good

Table 6

TABLE 6

Table of Examples and Comparative Examples

|  | Example 11 | Example 12 | Example 13 | Comparative Example 7 | Comparative Example 8 |
|---|---|---|---|---|---|
| Epoxy resin composition | 1 | 2 | 3 | 4 | 5 |
| Conductivity | ○ | ○ | Δ | X | X |
| Moisture resistance reliability | ○ | ○ | Δ | X | X |

○: good,
Δ: acceptable,
X: no-good

Example 15

The amine adduct A-1 of 100 parts by mass, obtained in Production Example 1-1, was melted, to which 0.6 part by mass of 2-ethyl-4-methylimidazole, as the low molecular weight amine compound (B), was homogeneously mixed, and crushed after cooling to room temperature to yield the hardener C-1 for an epoxy resin, having a softening point of 97° C. and an average particle diameter of 2.5 μm. To 150 parts by mass of the epoxy resin E-1, 100 parts by mass of the hardener C-1 for an epoxy resin, 1.5 parts by mass of water and parts by mass of tolylene diisocyanate were added to continue a reaction for 3 hours under stirring at 40° C. Then, 150 parts of the highly soluble epoxy resin G-1 and 2 parts of the cyclic borate ester compound (L) were added to yield the master batch type hardener F-1 for an epoxy resin to be a latent hardener. Total chlorine amount of the master batch type hardener F-1 for an epoxy resin was 700 ppm. The microcapsule type hardener D-1 for an epoxy resin was separated from the master batch type hardener F-1 for an epoxy resin, using xylene, and presence of the bonding groups (x), (y) and (z) was confirmed by FT-IR measurement.

Furthermore, hardening property-1 and storage stability-1 of a one component epoxy resin composition, obtained by formulating 30 parts of the resultant master batch type hardener F-1 for an epoxy resin to 100 parts of the epoxy resin E-1, were evaluated. The results are shown in Table 7.

Examples 16 to 17

The hardeners C-2 and C-3 for an epoxy resin were obtained in the same way as in Example 15, using the formulation shown in Table 7. Characteristics of the resultant hardeners for an epoxy resin are shown in Table 7. Furthermore, the master batch type hardeners F-2 to F-3 for an epoxy resin were obtained in the same way as in Example 15, using the formulation shown in Table 7. Presence of the bonding groups (x), (y) and (z) was confirmed in any of F-2 to F-3, in the same way as in Example 15, and hardening property-1 and storage stability-1 of a one component epoxy resin composition, obtained in the same way as in Example 15 using the master batch type hardeners F-2 to F-3 as a hardener, were evaluated. The evaluation results are shown in Table 7.

Example 18

One equivalent of a bisphenol F type epoxy resin (epoxy equivalent 165 g/equivalent, total chlorine amount 300 ppm: hereinafter referred to as the epoxy resin a1-2) and 1 equivalent of 2-methylimidazole (converted value to an active hydrogen) were reacted in a mixed solvent (resin content 50%) of n-butanol/toluene=1/1 at 80° C. for 6 hours. Then, the reaction solution was subjected to distillation under reduced pressure at 200° C. to remove unreacted 2-methylimidazole, along with the solvent, until the content of 2-methylimidazole became was 0.05% by mass (based on resin content), to yield an amine hardener comprising an amine adduct having a molecular weight distribution of 1.4 (referred to as the amine adduct A-4) and 0.05% by mass of 2-methylimidazole as the low molecular weight amine compound (B). The resultant amine hardener was crushed at room temperature to yield the hardener C-4 for an epoxy resin, having a softening point of 101° C. and an average particle diameter of 2.4 μm.

Furthermore, the master batch type hardener F-4 for an epoxy resin was obtained in the same way as in Example 15, using the formulation shown in Table 7. Presence of the bonding groups (x), (y) and (z) was confirmed, in the same way as in Example 15, and hardening property-1 and storage stability-1 of a one component epoxy resin composition, obtained in the same way as in Example 15 using the master batch type hardener F-4 for an epoxy resin, as a hardener, were evaluated. The evaluation results are shown in Table 7.

Comparative Example 9

Using the amine adduct A-5, obtained in Production Example 1-4, and 0.2 part by mass of triethylene diamine, as the low molecular weight amine compound (B), the hardener C-5 for an epoxy resin was obtained in the same way as in Example 15. Characteristics of the resultant hardener C-5 for an epoxy resin are shown in Table 7.

Furthermore, the master batch type hardener F-5 for an epoxy resin was obtained in the same way as in Example 15, using the formulation shown in Table 7. Hardening property-1 and storage stability-1 of a one component epoxy resin composition, obtained in the same way as in Example 15 using the master batch type hardener F-5 for an epoxy resin, as a hardener, were evaluated. The evaluation results are shown in Table 7.

As shown in Table 7, in the present Comparative Example, wherein molecular weight distribution of the amine adduct (A-5) is over 3, diffusibility of the amine adduct (A-5) into an epoxy resin is low under hardening temperature condition, resulting in low hardening property.

Comparative Example 10

The formulation substance (only the amine adduct A-1) shown in Table 7 was crushed to yield an amine hardener, having a softening point of 103° C. and an average particle diameter of 2.5 μm.

Furthermore, a master batch type hardener for an epoxy resin was obtained in the same way as in Example 15, using the formulation shown in Table 7. Hardening property-1 and storage stability-1 of a one component epoxy resin composition, obtained in the same way as in Example 15 using the master batch type hardener for an epoxy resin, as a hardener, were evaluated. The evaluation results are shown in Table 7.

Comparative Example 11

Using the amine adduct A-1, obtained in Production Example 1-1, 2 parts by mass of 2-methylimidazole, as the low molecular weight amine compound (B), was homogeneously mixed thereto, and the mixture was crushed after cooling to room temperature to yield the hardener C-6 for an epoxy resin, having a softening point of 94° C. and an average particle diameter of 1.9 μm. Characteristics of the resultant hardener C-6 for an epoxy resin are shown in Table 7.

Furthermore, the master batch type hardener F-6 for an epoxy resin was obtained in the same way as in Example 15, using the formulation shown in Table 7. Hardening property-1 and storage stability-1 of a one component epoxy resin The resultant amine hardener was crushed under cooling to yield the hardener C-7 for an epoxy resin, having a softening point of 60° C. and an average particle diameter of 7.1 μm.

Furthermore, production of a master batch type hardener was tried in the same way as in Example 15, using a formulation in Table 7, however, gelation started in the midst of the reaction and failed to yield a master batch type hardener.

[Table 7]

TABLE 7

Table of Examples and Comparative Examples

| | | Example 15 | Example 16 | Example 17 | Example 18 | Comparative Example 9 | Comparative Example 10 | Comparative Example 11 | Comparative Example 12 |
|---|---|---|---|---|---|---|---|---|---|
| Hardener (C) for an epoxy resin | Amine adduct (A) | A-1 | A-2 | A-3 | A-4 | A-5 | A-1 | A-3 | A-7 |
| | M.W. distribution | 1.4 | 1.1 | 2.1 | 1.4 | 3.7 | 1.4 | 2.1 | 1.1 |
| | Low molecule weight amine compound (B) (parts) | 2E4MZ | TEDA | 2MZ | 2MZ | TEDA | — | 2MZ | 2MZ |
| | | 0.8 | 0.2 | 0.3 | 0.05 | 0.2 | | 2 | 20 |
| | Softening point (° C.) | 97 | 102 | 103 | 101 | 103 | 103 | 94 | 60 |
| | Average particle diameter (μm) | 2.5 | 2.9 | 1.9 | 2.4 | 2.0 | 1.9 | 2.5 | 7.1 |
| Master batch type hardener (F) | Hardener for an epoxy resin | C-1 | C-2 | C-3 | C-4 | C-5 | A-1 | A-1 | C-7 |
| | | 100 | 100 | 100 | 100 | 100 | 100 | 100 | 100 |
| | Epoxy resin (E) (parts) | E-1 | E-2 | E-1 | E-2 | E-2 | E-2 | E-2 | E-1 |
| | | 150 | 150 | 150 | 150 | 200 | 150 | 200 | 150 |
| | Highly soluble epoxy resin (G) | G-1 | G-2 | G-3 | G-1 | — | X | — | G-1 |
| | | 50 | 50 | 50 | 50 | | 50 | | 50 |
| | Isocyanate compound (H) | TDI | OTI | MR-200 | MR-200 | MR-200 | MDI | MR-200 | TDI |
| | | 5 | 8 | 11 | 9 | 10 | 10 | 9 | 7 |
| | Water (Active hydrogen Compound (I)) (parts) | 1.5 | 2 | 2.2 | 2 s | 2 | 1.5 | 1.5 | 2 |
| | Cyclic borate ester compound (L) (parts) | 2 | 0.1 | 0.2 | 0.5 | 0.5 | — | 0.02 | — |
| | Total chlorine amount (ppm) | 700 | 680 | 680 | 700 | 700 | 2300 | 700 | — |
| One component epoxy resin compound Storage stability-1 | | ◎ | ○ | ◎ | ◎ | ○ | X | XX | Gelation while producing the master batch type hardener |
| Hardening property (minutes) | | 10 | 2.5 | 25 | 7 | No gelation | 13 | 14 | — |

Epoxy resin E-1: bisphenol A type liquid epoxy resin (epoxy equivalent 175 g/equivalent, SP: 8.895, molecular weight between crosslinked points 170, total chlorine amount: 300 ppm)
Epoxy resin E-2: bisphenol F type liquid epoxy resin (epoxy equivalent 165 g/equivalent, SP: 9.040, molecular weight between crosslinked points 156, total chlorine amount: 300 ppm)
2MZ: 2-methylimidazole
TEDA: triethylene diamine
2E4MZ: 2-ethyl-4-methylimidazole
TDI: tolylene diisocyanate
OTI: 1,8-diisocyanato-4-isocyanatomethyloctane
MDI: 4,4'-diphenylmethane diisocyanate
MR-200: polymethylenephenylene polyisocyanate produced from NIPPON-POLYURETHANE INDUSTRY CO, LTD.
Cyclic borate ester compound (L): 2,2'-oxybis(5,5'-dimethyl-1,3,2-dioxaborinane)

composition, obtained in the same way as in Example 15 using the master batch type hardener F-6 for an epoxy resin, as a hardener, were evaluated. The evaluation results are shown in Table 7.

Comparative Example 12

One equivalent of the epoxy resin E-1 and 2 equivalents of 2-methylimidazole (converted value to an active hydrogen) were reacted in a mixed solvent (resin content 50%) of n-butanol/toluene=1/1 at 80° C. for 6 hours. Then, the solvent was removed at 180° C. under reduced pressure, to yield an amine hardener comprising an amine adduct having a molecular weight distribution of 1.1 (referred to as the amine adduct A-7) and 20% by mass of 2-methylimidazole as the low molecular weight amine compound (B).

INDUSTRIAL APPLICABILITY

According to the present invention, an epoxy resin composition which satisfies both hardening property at low temperature and storage stability, and further provides a hardened substance with excellently balanced performances of electric characteristics, mechanical strength, heat resistance, humidity resistance, and the like can be obtained. An epoxy resin composition using a capsule type hardener of the present invention exerts excellent performance as adhesives, sealant, filling material, insulating material, conductive material, prepreg, film-like adhesives, anisotropic conductive films, anisotropic conductive paste, insulating adhesive films, insulating adhesive paste, under-fill material, potting material, die bonding material, conductive paste, solder resist, and the like.

The invention claimed is:

1. An amine hardener (C) for an epoxy resin comprising: an amine adduct (A) and a low molecular weight amine compound (B) as major components;
   wherein the amine adduct (A) is obtained by a reaction between an epoxy resin (a1) and an amine compound (b1) and has a molecular weight distribution, which is defined by the ratio of the weight average molecular weight and the number average molecular weight, of 3 or lower, and
   wherein the content of the low molecular weight amine compound (B) is 0.001 to 1 part by mass, based on 100 parts by mass of the amine adduct (A).

2. The hardener according to claim 1, wherein it is in solid state at 25° C.

3. The hardener according to claim 1, wherein said low molecular weight amine compound (B) is imidazoles.

4. A microcapsule type hardener (D) for an epoxy resin comprising a core and a shell;
   wherein said core comprises the amine hardener (C) according to claim 1; and
   wherein said shell contains a synthetic resin or an inorganic oxide.

5. A master batch type hardener (F) for an epoxy resin comprising:
   the microcapsule type hardener (D) according to claim 4, an epoxy resin (E) and a highly soluble epoxy resin (G);
   wherein the highly soluble epoxy resin (G): has a solubility parameter of 8.900 to 12.00; has a molecular weight between crosslinked points after hardening of 105 to 150; and is contained in an amount of not lower than 0.1% by weight, based on the epoxy resin (E); and
   wherein the total chlorine amount of said master batch type hardener (F) for an epoxy resin is not higher than 2000 ppm.

6. The epoxy resin composition according to claim 5, wherein said highly soluble epoxy resin (G) has impurity components at the diol terminals equivalent to 0.001 to 30% of fundamental structure component of said highly soluble epoxy resin.

7. The epoxy resin composition according to claim 5 or 6, wherein the total chlorine amount of said epoxy resin (E) is not higher than 2000 ppm.

8. The microcapsule type hardener (D) according to claim 4, wherein the shell comprises a coating film (c1) yielded by a reaction between an isocyanate compound (H) and an active hydrogen compound (I) and/or a coating film (c2) yielded by a reaction between the amine hardener (C) and an epoxy resin (E);
   wherein the shell comprises a bonding group (x) absorbing infrared ray in a wave number region of 1630 to 1680 $cm^{-1}$, and a bonding group (y) absorbing infrared ray in a wave number region of 1680 to 1725 $cm^{-1}$, at least at the surface.

9. A master batch type hardener (F) for an epoxy resin comprising: the amine hardener (C) according to claim 1, an epoxy resin (E), and a highly soluble epoxy resin (G);
   wherein the highly soluble epoxy resin (G): has a solubility parameter of 8.900 to 12:00; has a molecular weight between crosslinked points after hardening of 105 to 150; and is contained in an amount of not lower than 0.1% by weight, based on the epoxy resin (E); and
   wherein the total chlorine amount of said master batch type hardener (F) for an epoxy resin is not higher than 2000 ppm.

10. An epoxy resin composition comprising 100 parts by mass of an epoxy resin and 0.1 to 100 parts by mass of an amine hardener, which is selected from the group consisting of:
    an amine hardener (C), a microcapsule type hardener (D), and a master batch type hardener (F);
    wherein the amine hardener (C) comprises: an amine adduct (A) and a low molecular weight amine compound (B) as major components; wherein the amine adduct (A) is obtained by a reaction between an epoxy resin (a1) and an amine compound (b1) and has a molecular weight distribution, which is defined by the ratio of the weight average molecular weight and the number average molecular weight, of 3 or lower, and wherein the content of the low molecular weight amine compound (B) is 0.001 to 1 part by mass, based on 100 parts by mass of the amine adduct (A);
    wherein the microcapsule type hardener (D) comprises: a core and a shell; wherein said core comprises the amine hardener (C); and wherein said shell contains a synthetic resin or an inorganic oxide; and
    wherein the master batch type hardener (F) comprises: a hardener selected from the amine hardener (C) and the microcapsule type hardener (D), an epoxy resin (E), and a highly soluble epoxy resin (G); wherein the highly soluble epoxy resin (G): has a solubility parameter of 8.900 to 12.00; has a molecular weight between crosslinked points after hardening of 105 to 150; and is contained in an amount of not lower than 0.1% by weight, based on the epoxy resin (E); and wherein the total chlorine amount of said master batch type hardener (F) is not higher than 2000 ppm.

11. The epoxy resin composition according to claim 10, further comprising 1 to 200 parts by mass of at least one kind of a hardener (K) selected from the group consisting of acid anhydrides, phenols, hydrazides and guanidines, based on 100 parts by mass of said epoxy resin (E).

12. The epoxy resin composition according to claim 10, further comprising a cyclic borate ester compound (L); and wherein the amine hardener is the microcapsule type hardener (D).

13. The epoxy resin composition according to claim 12, wherein said cyclic borate ester compound (L) is 2,2'-oxybis(5,5'-dimethyl-1,3,2-dioxaborinane).

14. The epoxy resin composition according to claim 12, wherein the cyclic borate ester compound (L) is provided in 0.001 to 10 parts by mass, based on 100 parts by mass of said epoxy resin.

15. An anisotropic conductive material comprising the epoxy resin composition according to claim 10.

16. A film for bonding comprising the epoxy resin composition according to claim 10.

17. A paste for bonding a semiconductor comprising the epoxy resin composition according to claim 10.

18. A sealant comprising the epoxy resin composition according to claim 10.

19. A structural adhesive comprising the epoxy resin composition according to claim 10.

* * * * *